United States Patent
Matsuzaki et al.

(10) Patent No.: US 7,383,201 B2
(45) Date of Patent: Jun. 3, 2008

(54) DEMAND FORECAST DEVICE, METHOD, AND PROGRAM PRODUCT

(75) Inventors: Koichiro Matsuzaki, Kanagawa (JP); Rikio Shiba, Kanagawa (JP); Toshihiko Kuwahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1344 days.

(21) Appl. No.: 10/310,084

(22) Filed: Dec. 4, 2002

(65) Prior Publication Data
US 2003/0105661 A1 Jun. 5, 2003

(30) Foreign Application Priority Data

| Dec. 5, 2001 | (JP) | ............................. 2001-371576 |
| Dec. 5, 2001 | (JP) | ............................. 2001-371577 |
| Nov. 18, 2002 | (JP) | ............................. 2002-333730 |
| Nov. 18, 2002 | (JP) | ............................. 2002-333731 |
| Nov. 18, 2002 | (JP) | ............................. 2002-333817 |
| Nov. 18, 2002 | (JP) | ............................. 2002-333818 |

(51) Int. Cl.
*G06F 17/50* (2006.01)
(52) U.S. Cl. .......................................... 705/10; 705/7
(58) Field of Classification Search .................... 705/9, 705/7

See application file for complete search history.

(56) References Cited

U.S. PATENT DOCUMENTS

| 5,953,707 A * | 9/1999 | Huang et al. ................. 705/10 |
| 2002/0143598 A1* | 10/2002 | Scheer ........................... 705/9 |
| 2002/0156692 A1* | 10/2002 | Squeglia et al. .............. 705/26 |
| 2002/0169657 A1* | 11/2002 | Singh et al. .................. 705/10 |

FOREIGN PATENT DOCUMENTS

| JP | 2001-014295 | 1/2001 |
| JP | 2001-167079 | 6/2001 |

OTHER PUBLICATIONS

Aviv, Yossil; "The Effect of Collaborative Forecasting on Supply Chain Performance", Management Science, Oct. 2001.*
Kuo, R.J., Xue, K.C., "An Intelligent Sales Forecasting System through Integration of Artificial Neural Network and Fuzzy Neural Network", Computers in Industry, 1998.*

* cited by examiner

*Primary Examiner*—Yogesh C. Garg
*Assistant Examiner*—Kalyan Deshpande
(74) *Attorney, Agent, or Firm*—Morgan & Finnegan, L.L.P.

(57) ABSTRACT

Conventionally, for a product accompanied by supplies such as a copy machine or a printer, the demand figures relating to the supply which such a main machine consumes have been determined empirically from the transition of the past sales records of the supply, the trends of the market, and a sales scheduled figures of the main machine. Therefore, the forecasted values of the demand figures differ in accordance with the skills or experiences of individuals carrying out the forecasting, and necessarily, the accuracy of the forecasted values deteriorates. Further, a demand forecast method relating to the supplies of a product has not been realized due to the large number of parameters, the complexity of calculation, and the difficulty of a systematic approach for solving problems.

In order to overcome the above-described problems, the invention of the present application forecasts consumption figures of a supply for outputting an outputted matter in the future, on the basis of inputted output figures of an outputted matter outputted by a product and sales figures of the supply.

2 Claims, 50 Drawing Sheets

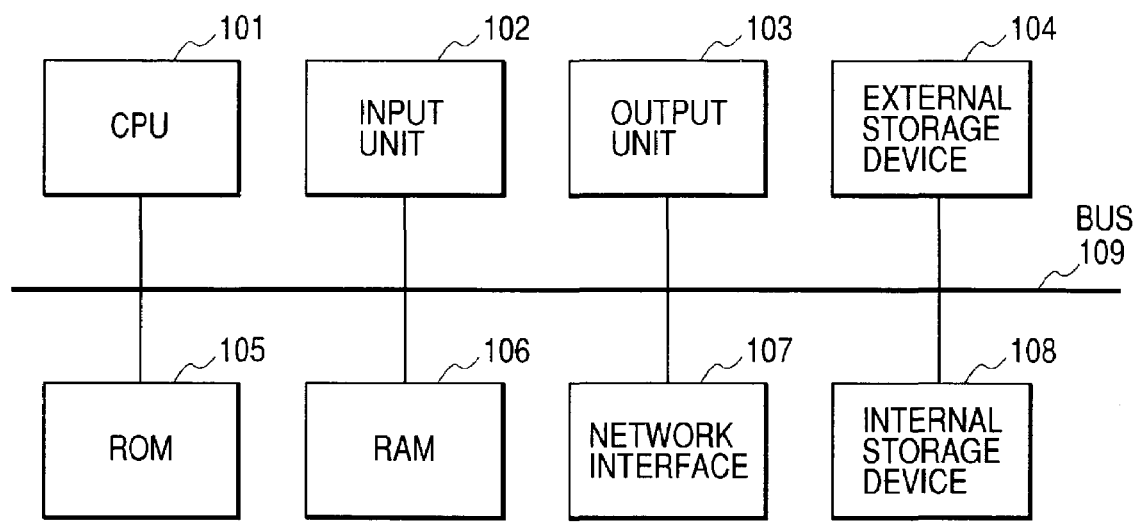

FIG. 3

| | 2001/01 | 2001/02 | 2001/03 | 2001/04 | 2001/05 | 2001/06 | 2001/07 | 2001/08 | 2001/09 | 2001/10 | 2001/11 | 2001/12 |
|---|---|---|---|---|---|---|---|---|---|---|---|---|
| MAIN MACHINE SALES RECORD FIGURES a (t) | NULL | 21 | 53 | 30 | 56 | 89 | 53 | 20 | NULL | NULL | NULL | NULL |
| MAIN MACHINE SALES SCHEDULE FIGURES b (t) | 0 | 15 | 60 | 25 | 40 | 50 | 60 | 10 | 50 | 30 | 50 | 10 |
| ⇨ | ⇨ | ⇨ | ⇨ | ⇨ | ⇨ | ⇨ | ⇨ | ⇨ | ⇨ | ⇨ | ⇨ | ⇨ |
| MAIN MACHINE SALES RECORD/ SCHEDULE FIGURES x (t) | 0 | 21 | 53 | 30 | 56 | 89 | 53 | 20 | 50 | 30 | 50 | 10 |

FIG. 4

| | 2001/01 | 2001/02 | 2001/03 | 2001/04 | 2001/05 | 2001/06 | 2001/07 | 2001/08 | 2001/09 | 2001/10 | 2001/11 | 2001/12 |
|---|---|---|---|---|---|---|---|---|---|---|---|---|
| OPERATING MAIN MACHINE RECORD FIGURES y (t) | 0 | 2 | 9 | 10 | 28 | 68 | 111 | 0 | 0 | 0 | 0 | 0 |

FIG. 7

|  | JP | US | UK | DE | FR |
|---|---|---|---|---|---|
| TONER A | ○ | ○ | ○ | ○ | ○ |
| TONER B | ○ | ○ |  |  |  |
| TONER C | ○ | ○ |  | ○ | ○ |
| DRAM A | ○ | ○ | ○ | ○ |  |
| DRAM B | ○ | ○ |  | ○ |  |

FIG. 15

| | x(t) | 2001/01 | 2001/02 | 2001/03 | 2001/04 | 2001/05 | 2001/06 | 2001/07 | 2001/08 | 2001/09 | 2001/10 | 2001/11 | 2001/12 |
|---|---|---|---|---|---|---|---|---|---|---|---|---|---|
| 2001/01 | 0 | 0 | 0 | 0 | 0 | 0 | | | | | | | |
| 2001/02 | 21 | | 2.1 | 3.15 | 8.4 | 5.25 | 2.1 | | | | | | |
| 2001/03 | 53 | | | 5.3 | 7.95 | 21.2 | 13.25 | 5.3 | | | | | |
| 2001/04 | 30 | | | | 3 | 4.5 | 12 | 7.5 | 3 | | | | |
| 2001/05 | 56 | | | | | 5.6 | 8.4 | 22.4 | 14 | 5.6 | | | |
| 2001/06 | 89 | | | | | | 8.9 | 13.35 | 35.6 | 22.25 | 8.9 | | |
| 2001/07 | 53 | | | | | | | 5.3 | 7.95 | 21.2 | 13.25 | 5.3 | |
| 2001/08 | 20 | | | | | | | | 2 | 3 | 8 | 5 | 2 |
| 2001/09 | 50 | | | | | | | | | 5 | 7.5 | 20 | 12.5 |
| 2001/10 | 30 | | | | | | | | | | 3 | 4.5 | 12 |
| 2001/11 | 50 | | | | | | | | | | | 5 | 7.5 |
| 2001/12 | 10 | | | | | | | | | | | | 1 |
| MONTHLY INSTALLED MACHINE FIGURES | | 0 | 2.1 | 8.45 | 19.35 | 36.55 | 44.65 | 53.85 | 62.55 | 57.05 | 40.65 | 39.8 | 35 |
| INSTALLED MACHINE TOTAL FIGURES | | 0 | 2.1 | 10.55 | 29.9 | 66.45 | 111.1 | 164.95 | 227.5 | 284.55 | 325.2 | 365 | 400 |
| y(t) | | 0 | 2 | 9 | 10 | 28 | 68 | 111 | 0 | 0 | 0 | 0 | 0 |

FIG. 17

INPUT CONTROL MODULE

- OUTPUT FIGURES INPUT MODULE
- SALES FIGURES INPUT MODULE

:

PROCESSING MODULE

- SUPPLY AMOUNT FORECAST MODULE
- COMPARISON MODULE

:

OUTPUT MODULE

- INPUT REQUEST DISPLAY MODULE
- PROCESS RESULT DISPLAY MODULE

:

NETWORK MODULE

| FORECAST METHOD | | DETERMINATION METHOD |
|---|---|---|
| SUPPLY INITIAL DEMAND FORECAST | MAIN MACHINE SALES FIGURES × INITIAL DEMAND COEFFICIENTS OR SUPPLY DEMAND FORECAST RESULT × INITIAL DEMAND COEFFICIENTS | DETERMINATION METHOD 1. WHETHER OR NOT WITHIN FORECAST TERM OF SUPPLY INITIAL DEMAND<br><br>DETERMINATION METHOD 2. COMPARE "DIFFERENCE BETWEEN SALES RECORD AND SUPPLY DEMAND FORECAST RESULT" WITH "DIFFERENCE BETWEEN SALES RECORD AND SUPPLY INITIAL DEMAND FORECAST RESULT" |
| COMPETITOR REFLECTED SUPPLY DEMAND FORECAST | SUPPLY DEMAND FORECAST RESULT × COMPETITOR REFLECTED SUPPLY DEMAND FORECAST | DETERMINATION METHOD 1. WHETHER OR NOT WITHIN FORECAST TERM OF COMPETITOR REFLECTED SUPPLY DEMAND FORECAST<br><br>DETERMINATION METHOD 2. COMPARE "DIFFERENCE BETWEEN SALES RECORD AND SUPPLY DEMAND FORECAST RESULT" WITH "DIFFERENCE BETWEEN SALES RECORD AND COMPETITOR REFLECTED SUPPLY DEMAND FORECAST RESULT" |
| SUPPLY TREND DEMAND FORECAST | REGRESSION ANALYSIS OF SUPPLY SALES RECORD | DETERMINATION METHOD 1. WHETHER OR NOT WITHIN FORECAST TERM OF COMPETITOR REFLECTED SUPPLY TREND DEMAND FORECAST<br><br>DETERMINATION METHOD 2. COMPARE "DIFFERENCE BETWEEN SALES RECORD AND SUPPLY DEMAND FORECAST RESULT" WITH "DIFFERENCE BETWEEN SALES RECORD AND SUPPLY TREND DEMAND FORECAST RESULT" |

SUPPLY INITIAL DEMAND/SALES AREA CROSS MASTER (MC3)

| CROSS NO. | OBJECT MODEL | OBJECT AREA | INITIAL DEMAND MODEL |
|---|---|---|---|
| 10001 | C2000BLACK | JAPAN | A01 |
| 10002 | C2000YELLOW | JAPAN | A02 |
| 10003 | C2000MAGENTA | JAPAN | A02 |
| 10004 | C2000CYAN | JAPAN | A02 |
| 10010 | X3500BLACK | USA | B01 |

DB (F):
SUPPLY INITIAL DEMAND/SALES AREA CROSS MASTER DB

· SUPPLY INITIAL DEMAND MODEL MASTER (MI1)

A. MAIN MACHINE ATTACHED MODEL

|     | 1st MONTH – 6th MONTH | 7th MONTH – 12th MONTH | NOTE |
|-----|---|---|---|
| A01 | 1 |   | PRINTER A3 DOMESTIC |
| A02 | 1.5 |   | PRINTER A4 DOMESTIC |
| A03 | 1.3 | 1.5 | PRINTER A3 EUROPE |
| A04 | 1.5 | 2 | PRINTER A4 EUROPE |

B. DEMAND FORECAST PROPORTION MODEL

|     | 1st MONTH – 6th MONTH | 7th MONTH – 12th MONTH | NOTE |
|-----|---|---|---|
| B01 | 1.5 | 2 | COPY MACHINE A3 DOMESTIC |
| B02 | 2 | 2 | COPY MACHINE A4 DOMESTIC |
| B03 | 1.5 |   | COPY MACHINE A3 EUROPE |
| B04 | 2 |   | COPY MACHINE A4 EUROPE |

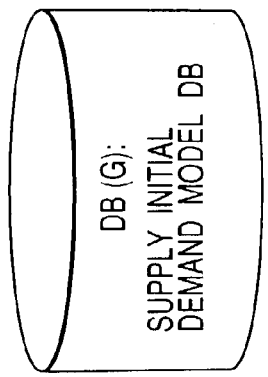

DB (G):
SUPPLY INITIAL
DEMAND MODEL DB

- MAIN MACHINE SALES SCHEDULE (PM)
- MAIN MACHINE SALES RECORD (RM)
- MAIN MACHINE SALES RECORD/SCHEDULE (RPM)

| | | 2002 | | | | | | | | | | | |
|---|---|---|---|---|---|---|---|---|---|---|---|---|---|
| | | JAN | FEB | MAR | APR | MAY | JUN | JUL | AUG | SEP | OCT | NOV | DEC |
| C2000 PRINTER | MAIN MACHINE SALES SCHEDULE | 100 | 100 | 100 | 100 | 100 | 100 | 120 | 120 | 120 | 120 | 120 | 120 |
| | MAIN MACHINE SALES RECORD | 120 | 115 | 65 | 110 | | | | | | | | |
| | MAIN MACHINE SALES RECORD/SCHEDULE | 120 | 115 | 65 | 110 | 100 | 100 | 120 | 120 | 120 | 120 | 120 | 120 |

DB (H): MAIN MACHINE SALES SCHEDULE/ RECORD DB

- SUPPLY INITIAL DEMAND FORECAST RESULT (FC3)
- SUPPLY SALES RECORD (RC)

| | | 2002 | | | | | | | | | | | |
|---|---|---|---|---|---|---|---|---|---|---|---|---|---|
| | | JAN | FEB | MAR | APR | MAY | JUN | JUL | AUG | SEP | OCT | NOV | DEC |
| C2000 CARTRIDGE BLACK | INITIAL DEMAND FORECAST RESULT | 180 | 173 | 98 | 165 | 150 | 150 | - | - | - | - | - | - |
| | SUPPLY SALES RECORD | 170 | 130 | 165 | 135 | - | - | - | - | - | - | - | - |

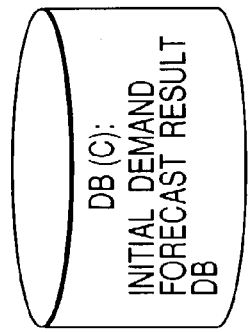

DB (C): INITIAL DEMAND FORECAST RESULT DB

| CONVENTIONAL MODEL/ SALES AREA CROSS | OBJECT MODEL | OBJECT AREA | COMPETITOR REFLECTED CROSS MASTER' |
|---|---|---|---|
| 10001 | C2000BLACK | JAPAN | A01 |

DB (K): COMPETITOR REFLECTED SUPPLY DEMAND FORECAST CROSS MASTER DB

| START MONTH | COMPETITOR REFLECTED COEFFICIENTS | NOTE |
|---|---|---|
| A01 | 24 | 0.7 | PRINTER DOMESTIC |

DB (L): COMPETITOR REFLECTED SUPPLY FORECAST MODEL MASTER DB

SUPPLY SALES RECORD (RC)

|  | M01 | M02 | M03 | M04 | M05 | M06 | M07 | M08 | M09 | M10 | M11 | M12 |
|---|---|---|---|---|---|---|---|---|---|---|---|---|
| 1999 | 0 | 0 | 160 | 864 | 2,525 | 2,957 | 3,887 | 5,089 | 11,645 | 8,511 | 11,286 | 9,914 |
| 2000 | 10,754 | 11,497 | 17,446 | 14,618 | 14,978 | 19,520 | 13,907 | 15,918 | 19,601 | 23,281 | 25,955 | 22,503 |
| 2001 | 22,337 | | | | | | | | | | | |

DB (D):
SUPPLY SALES RECORD DB (DB(D))

- CREATE COMPETITOR REFLECTED SUPPLY FORECAST OBJECT TERM (T(FC5)) ON MAIN MEMORY

COMPETITOR REFLECTED SUPPLY FORECAST OBJECT TERM (T(FC5)) IS SET FOR TERM FROM LAPSE OF TERM (MONTHS) OF COMPETITOR REFLECTED FORECAST MODEL MASTER FROM FIRST MONTH OF SUPPLY SALES RECORD (RC).
"×" IS NON-OBJECT TERM, "○" IS OBJECT TERM.

COMPETITOR REFLECTED SUPPLY FORECAST OBJECT TERM (T(FC5))

|  | JAN | FEB | MAR | APR | MAY | JUN | JUL | AUG | SEP | OCT | NOV | DEC |
|---|---|---|---|---|---|---|---|---|---|---|---|---|
| 1999 | – | – | × | × | × | × | × | × | × | × | × | × |
| 2000 | × | × | × | × | × | × | × | × | × | × | × | × |
| 2001 | × | ○ | ○ | ○ | ○ | ○ | ○ | ○ | ○ | ○ | ○ | ○ |

- IN THE ABOVE EXAMPLE, SALES RECORD EXISTS FROM MARCH, 2002, AND OBJECT TERM STARTS FROM 24th MONTH (FEBRUARY, 2001).

SUPPLY DEMAND FORECAST RESULT (NOT COMPENSATED) (FC1)

|      | M01    | M02    | M03    | M04    | M05    | M06    | M07    | M08    | M09    | M10    | M11    | M12    |
|------|--------|--------|--------|--------|--------|--------|--------|--------|--------|--------|--------|--------|
| 1999 | 29     | 76     | 209    | 529    | 970    | 1,533  | 2,262  | 3,162  | 4,163  | 5,203  | 6,253  | 7,341  |
| 2000 | 8,487  | 9,688  | 10,910 | 12,090 | 13,208 | 14,269 | 15,323 | 16,414 | 17,570 | 18,740 | 19,864 | 20,990 |
| 2001 | 21,870 | 22,798 | 23,715 | 24,561 | 25,317 | 25,931 | 26,463 | 26,970 | 27,519 | 28,102 | 28,634 | 29,048 |

DB (A):
SUPPLY DEMAND FORECAST RESULT DB (DB(A))

COMPETITOR REFLECTED SUPPLY DEMAND FORECAST RESULT (FC5)

|      | M01    | M02    | M03    | M04    | M05    | M06    | M07    | M08    | M09    | M10    | M11    | M12    |
|------|--------|--------|--------|--------|--------|--------|--------|--------|--------|--------|--------|--------|
| 1999 | 29     | 76     | 209    | 529    | 970    | 1,533  | 2,262  | 3,162  | 4,163  | 5,203  | 6,253  | 7,341  |
| 2000 | 8,487  | 9,688  | 10,910 | 12,090 | 13,208 | 14,269 | 15,323 | 16,414 | 17,570 | 18,740 | 19,864 | 20,990 |
| 2001 | 21,870 | 15,959 | 16,601 | 17,193 | 17,722 | 18,152 | 18,524 | 18,879 | 19,263 | 19,671 | 20,044 | 20,334 |

DB (M):
COMPETITOR REFLECTED SUPPLY DEMAND FORECAST RESULT DB (DB(M))

- MAIN MACHINE SALES RECORD (RM)
- MAIN MACHINE SALES RECORD SCHEDULE (RPM)

| | M01 | M02 | M03 | M04 | M05 | M06 | M07 | M08 | M09 | M10 | M11 | M12 |
|---|---|---|---|---|---|---|---|---|---|---|---|---|
| | | | | | | Y2000 | | | | | | |
| MAIN MACHINE SALES RECORD | 101 | 97 | 175 | 201 | 198 | 273 | 101 | 97 | 137 | 110 | 180 | 198 |
| MAIN MACHINE SALES RECORD SCHEDULE | 101 | 97 | 175 | 201 | 198 | 273 | 101 | 97 | 137 | 110 | 180 | 198 |
| | M01 | M02 | M03 | M04 | M05 | M06 | M07 | M08 | M09 | M10 | M11 | M12 |
| | | | | | | Y2001 | | | | | | |
| MAIN MACHINE SALES RECORD | 87 | | | | | | | | | | | |
| MAIN MACHINE SALES RECORD SCHEDULE | 87 | 81 | 149 | 126 | 184 | 139 | 200 | 102 | 165 | 165 | 165 | 213 |

DB (H):
MAIN MACHINE SALES SCHEDULE/RECORD DB

AT S2702 OF FIG. 27

SUPPLY TREND FORECAST OBJECT ITEM

| TREND FORECAST OBJECT ITEM | C2000 CARTRIDGE | C4000 CARTRIDGE | L5000 TONER | . | . | . | . | . |
|---|---|---|---|---|---|---|---|---|
| | | | | | | | | |

DB (I): SUPPLY TREND FORECAST OBJECT ITEM DB

AT S2706 OF FIG. 27

SUPPLY SALES RECORD (RC)

| | JAN | FEB | MAR | APR | MAY | JUN | JUL | AUG | SEP | OCT | NOV | DEC |
|---|---|---|---|---|---|---|---|---|---|---|---|---|
| | | | | | | 2000 | | | | | | |
| SUPPLY SALES RECORD | 5,219 | 5,062 | 5,366 | 4,763 | 4,620 | 4,897 | 4,347 | 4,217 | 4,470 | 3,967 | 3,848 | 4,079 |
| | | | | | | 2001 | | | | | | |
| SUPPLY SALES RECORD | 3,621 | | | | | | | | | | | |

DB (D):
SUPPLY SALES RECORD DB

AT S2708 OF FIG. 27

| | JAN | FEB | MAR | APR | MAY | JUN | JUL | AUG | SEP | OCT | NOV | DEC |
|---|---|---|---|---|---|---|---|---|---|---|---|---|
| | | | | | | 2000 | | | | | | |
| SUPPLY TREND DEMAND FORECAST RESULT | 5,380 | 5,219 | 5,062 | 4,910 | 4,763 | 4,620 | 4,481 | 4,347 | 4,217 | 4,090 | 3,967 | 3,848 |
| SUPPLY SALES RECORD | 5,219 | 5,062 | 5,366 | 4,763 | 4,620 | 4,897 | 4,347 | 4,217 | 4,470 | 3,967 | 3,848 | 4,079 |
| | | | | | | 2001 | | | | | | |
| SUPPLY TREND DEMAND FORECAST RESULT | 3,733 | 3,621 | 3,512 | 3,407 | 3,304 | 3,205 | 3,109 | 3,016 | 2,925 | 2,838 | 2,752 | 2,670 |
| SUPPLY SALES RECORD | 3,621 | | | | | | | | | | | |

DB (J):
SUPPLY TREND DEMAND FORECAST RESULT DB

- SUPPLY DEMAND FORECAST RESULT (NOT COMPENSATED) (FC2)
- SUPPLY SALES RECORD (RC)

RESULT OF SUPPLY DEMAND FORECAST MODULE 101 IS WRITTEN INTO ABOVE TWO DATA

| 2000 | JAN | FEB | MAR | APR | MAY | JUN | JUL | AUG | SEP | OCT | NOV | DEC |
|---|---|---|---|---|---|---|---|---|---|---|---|---|
| SUPPLY SALES FORECAST RESULT | 5,380 | 5,272 | 5,167 | 5,064 | 4,963 | 4,864 | 4,767 | 4,672 | 4,579 | 4,487 | 4,397 | 4,309 |
| SUPPLY SALES RECORD | 5,219 | 5,062 | 5,366 | 4,763 | 4,620 | 4,897 | 4,347 | 4,217 | 4,470 | 3,967 | 3,848 | 4,079 |

| 2001 | JAN | FEB | MAR | APR | MAY | JUN | JUL | AUG | SEP | OCT | NOV | DEC |
|---|---|---|---|---|---|---|---|---|---|---|---|---|
| SUPPLY SALES FORECAST RESULT | 4,223 | 4,138 | 4,055 | 3,974 | 3,895 | 3,817 | 3,741 | 3,666 | 3,593 | 3,521 | 3,451 | 3,382 |
| SUPPLY SALES RECORD | 3,621 | | | | | | | | | | | |

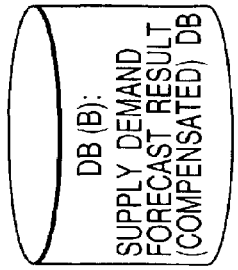

DB (B): SUPPLY DEMAND FORECAST RESULT (COMPENSATED) DB

- SUPPLY SALES RECORD (RC)

| 2000 | JAN | FEB | MAR | APR | MAY | JUN | JUL | AUG | SEP | OCT | NOV | DEC |
|---|---|---|---|---|---|---|---|---|---|---|---|---|
| SUPPLY SALES RECORD | 5,219 | 5,062 | 5,366 | 4,763 | 4,620 | 4,897 | 4,347 | 4,217 | 4,470 | 3,967 | 3,848 | 4,079 |

| 2001 | JAN | FEB | MAR | APR | MAY | JUN | JUL | AUG | SEP | OCT | NOV | DEC |
|---|---|---|---|---|---|---|---|---|---|---|---|---|
| SUPPLY SALES RECORD | 3,621 | | | | | | | | | | | |

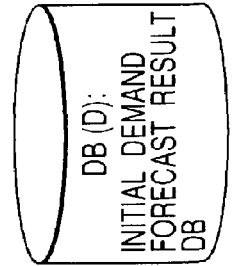

DB (D): INITIAL DEMAND FORECAST RESULT DB

| | | | | | | 2000 | | | | | | |
|---|---|---|---|---|---|---|---|---|---|---|---|---|
| | JAN | FEB | MAR | APR | MAY | JUN | JUL | AUG | SEP | OCT | NOV | DEC |
| SUPPLY SALES FORECAST RESULT | 5,380 | 5,219 | 5,062 | 4,910 | 4,763 | 4,620 | 4,481 | 4,347 | 4,217 | 4,090 | 3,967 | 3,848 |
| COMPETITOR REFLECTED SUPPLY DEMAND FORECAST RESULT | 5,380 | 5,219 | 5,062 | 4,910 | 4,763 | 4,620 | 4,481 | 4,347 | 4,217 | 4,090 | 3,967 | 3,848 |

| | | | | | | 2001 | | | | | | |
|---|---|---|---|---|---|---|---|---|---|---|---|---|
| | JAN | FEB | MAR | APR | MAY | JUN | JUL | AUG | SEP | OCT | NOV | DEC |
| SUPPLY SALES FORECAST RESULT | 3,733 | 3,621 | 3,512 | 3,407 | 3,305 | 3,206 | 3,110 | 3,017 | 2,926 | 2,838 | 2,753 | 2,670 |
| COMPETITOR REFLECTED SUPPLY DEMAND FORECAST RESULT | 2,613 | 2,535 | 2,458 | 2,385 | 2,314 | 2,244 | 2,177 | 2,112 | 2,048 | 1,987 | 1,927 | 1,869 |

DB (M): COMPETITOR REFLECTED SUPPLY DEMAND FORECAST RESULT DB (DB(M))

- SUPPLY TREND DEMAND FORECAST RESULT (FC4)
- SUPPLY SALES RECORD (RC)

| | \multicolumn{12}{c|}{2000} |
|---|---|---|---|---|---|---|---|---|---|---|---|---|
| | JAN | FEB | MAR | APR | MAY | JUN | JUL | AUG | SEP | OCT | NOV | DEC |
| SUPPLY TREND DEMAND FORECAST RESULT | 5,380 | 5,219 | 5,062 | 4,910 | 4,763 | 4,620 | 4,481 | 4,347 | 4,217 | 4,090 | 3,967 | 3,848 |
| SUPPLY SALES RECORD | 5,219 | 5,062 | 5,366 | 4,763 | 4,620 | 4,897 | 4,347 | 4,217 | 4,470 | 3,967 | 3,848 | 4,079 |

| | \multicolumn{12}{c|}{2001} |
|---|---|---|---|---|---|---|---|---|---|---|---|---|
| | JAN | FEB | MAR | APR | MAY | JUN | JUL | AUG | SEP | OCT | NOV | DEC |
| SUPPLY TREND DEMAND FORECAST RESULT | 3,733 | 3,621 | 3,512 | 3,407 | 3,304 | 3,205 | 3,109 | 3,016 | 2,925 | 2,838 | 2,752 | 2,670 |
| SUPPLY SALES RECORD | 3,621 | | | | | | | | | | | |

DB (J): SUPPLY TREND DEMAND FORECAST RESULT DB

- SUPPLY SALES RECORD (RC)

| | \multicolumn{12}{c|}{2000} |
|---|---|---|---|---|---|---|---|---|---|---|---|---|
| | JAN | FEB | MAR | APR | MAY | JUN | JUL | AUG | SEP | OCT | NOV | DEC |
| SUPPLY SALES RECORD | 5,219 | 5,062 | 5,366 | 4,763 | 4,620 | 4,897 | 4,347 | 4,217 | 4,470 | 3,967 | 3,848 | 4,079 |

| | \multicolumn{12}{c|}{2001} |
|---|---|---|---|---|---|---|---|---|---|---|---|---|
| | JAN | FEB | MAR | APR | MAY | JUN | JUL | AUG | SEP | OCT | NOV | DEC |
| SUPPLY SALES RECORD | 3,621 | | | | | | | | | | | |

DB (D): SUPPLY SALES RECORD DB

FIG. 34A

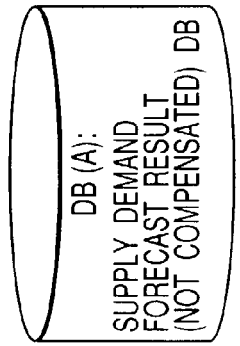

DB (A): SUPPLY DEMAND FORECAST RESULT (NOT COMPENSATED) DB

- SUPPLY DEMAND FORECAST RESULT (NOT COMPENSATED) (FC1) FORECAST RESULT (FC1) OF SUPPLY DEMAND FORECAST MODULE IS WRITTEN THEREIN
- SUPPLY SALES RECORD (RC) SUPPLY SALES RECORD (RC) IS WRITTEN THEREIN

FIG. 34B

DB (B): SUPPLY DEMAND FORECAST RESULT (COMPENSATED) DB

- SUPPLY DEMAND FORECAST RESULT (COMPENSATED) (FC2) ANY OF SUPPLY DEMAND FORECAST RESULT (NOT COMPENSATED) (FC1), SUPPLY INITIAL DEMAND FORECAST RESULT (FC3), SUPPLY TREND FORECAST RESULT (FC4), OR COMPETITOR REFLECTED SUPPLY FORECAST RESULT (FC5) SELECTED BY DETERMINATION MODULE IS WRITTEN THEREIN

FIG. 34C

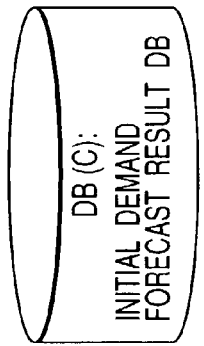

DB (C): INITIAL DEMAND FORECAST RESULT DB

- SUPPLY INITIAL DEMAND FORECAST RESULT SUPPLY INITIAL DEMAND FORECAST RESULT (FC3) IS WRITTEN THEREIN

FIG. 34D

DB (D): SUPPLY SALES RECORD DB

- SUPPLY SALES RECORD (RC) SUPPLY SALES RECORD (RC) IS WRITTEN THEREIN

FIG. 34E

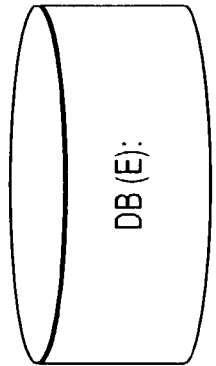

DB (E): COMPETITOR REFLECTED CROSS MASTER DB

- COMPETITOR REFLECTED CROSS MASTER
- COMPETITOR REFLECTED CROSS MASTER IS WRITTEN THEREIN

FIG. 34F

DB (F): SUPPLY INITIAL DEMAND CROSS MASTER DB

- SUPPLY INITIAL DEMAND/SALES AREA CROSS MASTER
- SUPPLY INITIAL DEMAND/SALES AREA CROSS MASTER (MC3) IS WRITTEN THEREIN

FIG. 34G

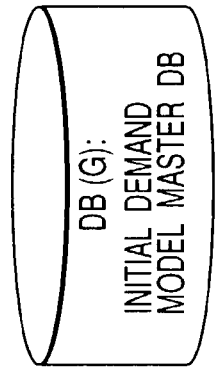

DB (G): INITIAL DEMAND MODEL MASTER DB

- SUPPLY INITIAL DEMAND MODEL MASTER
- SUPPLY INITIAL DEMAND MODEL MASTER (MI1) IS WRITTEN THEREIN

FIG. 34H

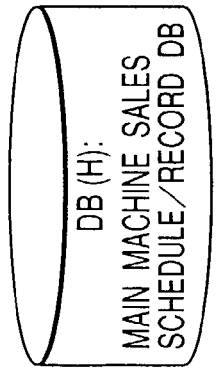

DB (H): MAIN MACHINE SALES SCHEDULE/RECORD DB

- MAIN MACHINE SALES SCHEDULE (PM)
- MAIN MACHINE SALES RECORD (RM)
- MAIN MACHINE SALES RECORD/SCHEDULE (RPM)

FIG. 35A

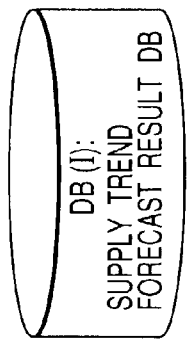

DB (I): SUPPLY TREND FORECAST RESULT DB

- SUPPLY TREND FORECAST ITEM
- SUPPLY TREND FORECAST RESULT (FC4) IS WRITTEN THEREIN

FIG. 35B

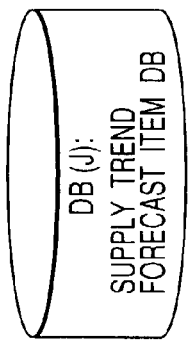

DB (J): SUPPLY TREND FORECAST ITEM DB

- SUPPLY TREND FORECAST ITEM (TFI)
- ARBITRARILY SET SUPPLY TREND FORECAST ITEM (TFI) IS WRITTEN THEREIN

FIG. 35C

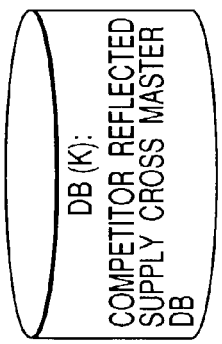

DB (K): COMPETITOR REFLECTED SUPPLY CROSS MASTER DB

- COMPETITOR REFLECTED CROSS MASTER
- COMPETITOR REFLECTED CROSS MASTER IS WRITTEN THEREIN

FIG. 35D

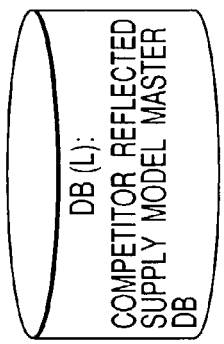

DB (L): COMPETITOR REFLECTED SUPPLY MODEL MASTER DB

- COMPETITOR REFLECTED FORECAST MODEL MASTER DB
- COMPETITOR REFLECTED FORECAST MODEL MASTER IS WRITTEN THEREIN

FIG. 35E

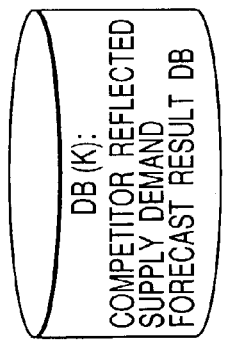

DB (K): COMPETITOR REFLECTED SUPPLY DEMAND FORECAST RESULT DB

- COMPETITOR REFLECTED SUPPLY FORECAST RESULT (FC5)
- FORECAST RESULT (FC5) OF COMPETITOR REFLECTED SUPPLY FORECAST MODULE IS WRITTEN THEREIN
- SUPPLY SALES RECORD (RC)
- SUPPLY SALES RECORD (RC) IS WRITTEN THEREIN

SUPPLY SALES RECORD (RC)

| | M01 | M02 | M03 | M04 | M05 | M06 | M07 | M08 | M09 | M10 | M11 | M12 |
|---|---|---|---|---|---|---|---|---|---|---|---|---|
| 1999 | 0 | 0 | 160 | 864 | 2,525 | 2,957 | 3,887 | 5,089 | 11,645 | 8,511 | 11,286 | 9,914 |
| 2000 | 10,754 | 11,497 | 17,446 | 14,618 | 14,978 | 19,520 | 13,907 | 15,918 | 19,601 | 23,281 | 25,955 | 22,503 |
| 2001 | 22,337 | | | | | | | | | | | |

COMPETITOR REFLECTED SUPPLY FORECAST OBJECT TERM (T(FC5))

| | JAN | FEB | MAR | APR | MAY | JUN | JUL | AUG | SEP | OCT | NOV | DEC |
|---|---|---|---|---|---|---|---|---|---|---|---|---|
| 1999 | − | − | × | × | × | × | × | × | × | × | × | × |
| 2000 | × | × | × | × | × | × | × | × | × | × | × | × |
| 2001 | × | ○ | ○ | ○ | ○ | ○ | ○ | ○ | ○ | ○ | ○ | ○ |

FIG. 36

DEMAND FORECAST PROFILE OF SALES AREA A

DEMAND FORECAST PROFILE OF SALES AREA B

DEMAND FORECAST PROFILE OF SALES AREA A

DEMAND FORECAST PROFILE OF SALES AREA B

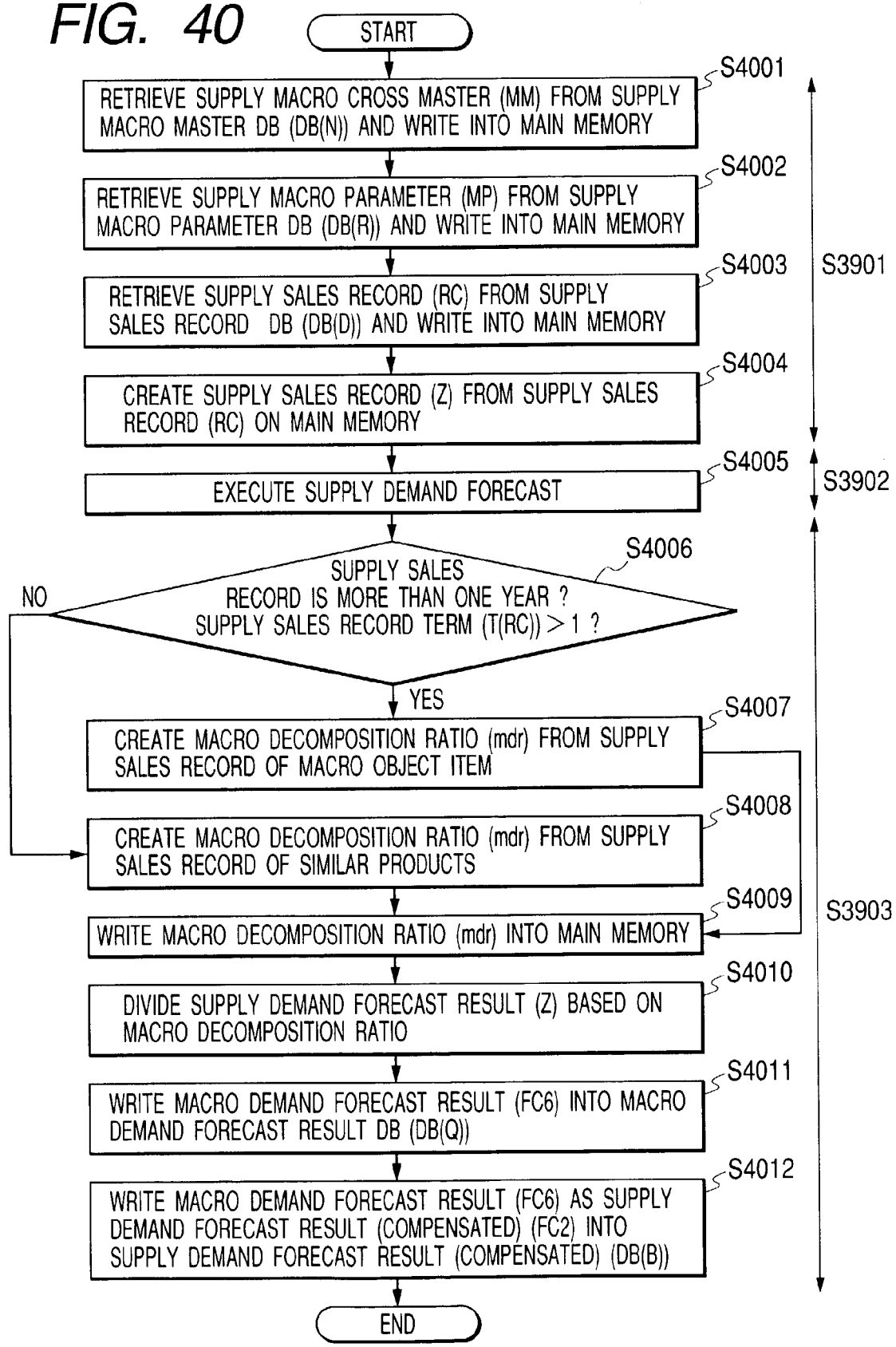

· SUPPLY MACRO CROSS MASTER (MM)

| MACRO NO. | AREA | SUPPLY NAME | SIMILAR SUPPLY |
|---|---|---|---|
| 10001 | CHINA | C2000 CART | C1500 CARTRIDGE |
| | | C4000 CART | C3000 CARTRIDGE |

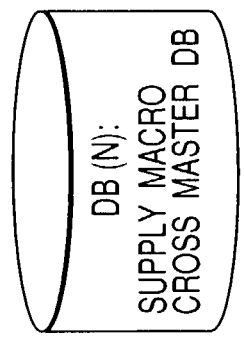

DB (N):
SUPPLY MACRO CROSS MASTER DB

· SUPPLY ENDURANCE PRINT VOLUME
· DIFFUSION MONTH
· DIFFUSION COEFFICIENTS

| SUPPLY | ENDURANCE | DIFFUSION MONTH | DIFFUSION COEFFICIENTS 1 | DIFFUSION COEFFICIENTS 2 | DIFFUSION COEFFICIENTS 3 |
|---|---|---|---|---|---|
| C2000 CARTRIDGE BLACK | 6,000 | 3 | 0.333 | 0.333 | 0.334 |
| C4000 CARTRIDGE BLACK | 9,000 | 3 | 0.333 | 0.333 | 0.334 |

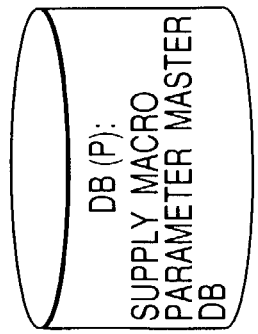

DB (P):
SUPPLY MACRO PARAMETER MASTER DB

- SUPPLY SALES RECORD (RC)

|  |  | 2002 | | | | | | | | | | | |
|---|---|---|---|---|---|---|---|---|---|---|---|---|
|  |  | JAN | FEB | MAR | APR | MAY | JUN | JUL | AUG | SEP | OCT | NOV | DEC |
| C2000 CARTRIDGE BLACK | SALES RECORD | 123 | 130 | 136 | 143 | 150 | 158 | 166 | | | | | |
| C4000 CARTRIDGE BLACK | SALES RECORD | 31 | 33 | 34 | 36 | 38 | 40 | 42 | | | | | |

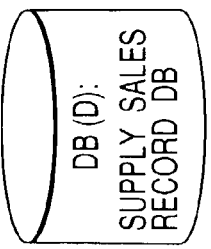

DB (D):
SUPPLY SALES
RECORD DB

FIG. 41D

AT S4004 OF FIG. 40 (ON MAIN MEMORY) (TOTAL SALES RECORD OF OBJECT SUPPLY)

- CREATE SUPPLY SALES RECORD (Z)

|  |  | 2002 | | | | | | | | | | | |
|---|---|---|---|---|---|---|---|---|---|---|---|---|
|  |  | JAN | FEB | MAR | APR | MAY | JUN | JUL | AUG | SEP | OCT | NOV | DEC |
| C2000 CARTRIDGE BLACK | SALES RECORD | 123 | 130 | 136 | 143 | 150 | 158 | 166 | | | | | |
| C4000 CARTRIDGE BLACK | SALES RECORD | 31 | 33 | 34 | 36 | 38 | 40 | 42 | | | | | |
| SUPPLY SALES RECORD (Z) | | 154 | 163 | 170 | 179 | 188 | 198 | 208 | | | | | |

· SUPPLY MACRO DECOMPOSITION MASTER

| | DECOMPOSITION RATIO |
|---|---|
| C2000 CARTRIDGE BLACK | 80 |
| C4000 CARTRIDGE BLACK | 20 |

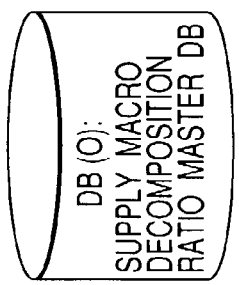

DB (O):
SUPPLY MACRO
DECOMPOSITION
RATIO MASTER DB

· SUPPLY MACRO DEMAND FORECAST RESULT (FC6)

| | 2002 | | | | | | | | | | | |
|---|---|---|---|---|---|---|---|---|---|---|---|---|
| | JAN | FEB | MAR | APR | MAY | JUN | JUL | AUG | SEP | OCT | NOV | DEC |
| SUPPLY SALES FORECAST RESULT (Z) | 150 | 158 | 166 | 174 | 183 | 193 | 203 | 213 | 223 | 234 | 246 | 258 |
| C2000 CARTRIDGE BLACK SUPPLY MACRO DEMAND FORECAST RESULT | 120 | 126 | 133 | 139 | 146 | 154 | 162 | 170 | 178 | 187 | 197 | 206 |
| C4000 CARTRIDGE BLACK SUPPLY MACRO DEMAND FORECAST RESULT | 30 | 32 | 33 | 35 | 37 | 39 | 41 | 43 | 45 | 47 | 49 | 52 |

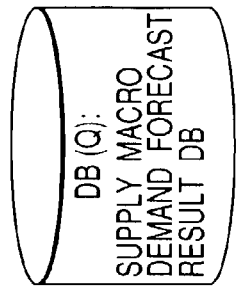

DB (Q):
SUPPLY MACRO
DEMAND FORECAST
RESULT DB

- SUPPLY SALES RECORD (RC)
- SUPPLY SALES FORECAST RESULT (COMPENSATED)

| | | 2002 | | | | | | | | | | | |
|---|---|---|---|---|---|---|---|---|---|---|---|---|---|
| | | JAN | FEB | MAR | APR | MAY | JUN | JUL | AUG | SEP | OCT | NOV | DEC |
| C2000 CARTRIDGE BLACK | SALES FORECAST (COMPENSATED) | 120 | 126 | 133 | 139 | 146 | 154 | 162 | 170 | 178 | 187 | 197 | 206 |
| | SALES RECORD | 123 | 130 | 136 | 143 | 150 | 158 | 166 | | | | | |
| C4000 CARTRIDGE BLACK | SALES FORECAST (COMPENSATED) | 30 | 32 | 33 | 35 | 37 | 39 | 41 | 43 | 45 | 47 | 49 | 52 |
| | SALES RECORD | 31 | 33 | 34 | 36 | 38 | 40 | 42 | | | | | |

DB (B): SUPPLY DEMAND FORECAST RESULT (COMPENSATED) DB

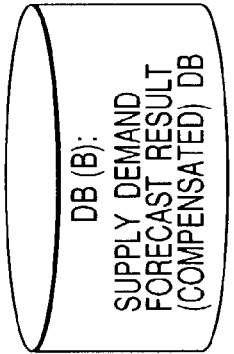

FIG. 43A

DB (B): SUPPLY DEMAND FORECAST RESULT (COMPENSATED) DB

- SUPPLY SALES RECORD (RC)
- SUPPLY SALES FORECAST RESULT (COMPENSATED)

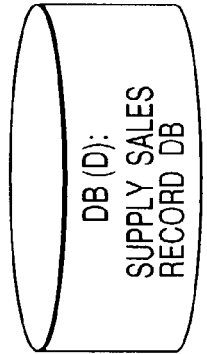

FIG. 43B

DB (D): SUPPLY SALES RECORD DB

- SUPPLY SALES RECORD (RC)
- SUPPLY SALES RECORD (RC) IS WRITTEN THEREIN

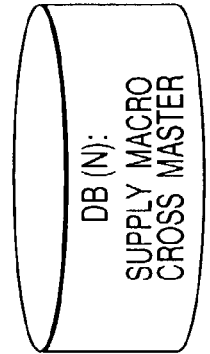

FIG. 43C

DB (N): SUPPLY MACRO CROSS MASTER

- SUPPLY MACRO CROSS MASTER
- SUPPLY MACRO COMPOSITION
- SIMILAR SUPPLY COMPOSITION

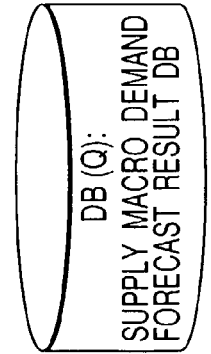

FIG. 43D

DB (Q): SUPPLY MACRO DEMAND FORECAST RESULT DB

- SUPPLY MACRO DEMAND FORECAST RESULT (FC6)

FIG. 43E

DB (P): SUPPLY MACRO PARAMETER MASTER DB

- SUPPLY ENDURANCE PRINT VOLUME
- DIFFUSION MONTH
- DIFFUSION COEFFICIENTS

| | JAN | FEB | MAR | APR | MAY | JUN | JUL | AUG | SEP | OCT | TOTAL |
|---|---|---|---|---|---|---|---|---|---|---|---|
| C2000 CARTRIDGE BLACK | 0 | 10 | 20 | 30 | 30 | 40 | 20 | 50 | 70 | 100 | 370 |
| C4000 CARTRIDGE BLACK | 0 | 0 | 10 | 0 | 5 | 20 | 50 | 10 | 20 | 30 | 145 |

DEMAND FORECAST DEVICE, METHOD, AND PROGRAM PRODUCT

BACKGROUND OF THE INVENTION

1. Field of the Invention

The present invention relates to a supply demand forecasting device, method, and program, and in particular, to a supply demand forecasting device, method, and program for forecasting the demand of supplies which a main machine consumes before and after a product accompanying supplies (hereinafter, "main machine") is sold on the market.

2. Related Background Art

Conventionally, with respect to a product, such as a copy machine or a printer, accompanying supply (hereinafter, "main machine"), the demand figure relating to a supply which such a main machine consumes is determined empirically from changes in the past sales records of the supply, trends of the market, and sales schedule figures of the main machine.

In this way, because the forecast of the demand figure (hereinafter, "demand forecast") depends on rules learned by experience or know-how, the forecasted value of the demand figure differs in accordance with the skills and experience of an individual carrying out the forecast, and necessarily, the accuracy of the forecasted value deteriorates. In this way, a demand forecast method relating to supplies for a product has not been realized due to the large number of parameters, the complexity of calculation, and the difficulty of a systematic approach for solving problems.

SUMMARY OF THE INVENTION

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing a configuration of an information processing device for realizing a demand forecast device, method, and program of the present invention.

FIG. 2 is a table showing a table for explanation of forecast process units in an embodiment.

FIG. 3 is a table showing one example in which main machine sales record/schedule figures x(t) are calculated from main machine sales record figures a(t) and main machine sales schedule figures b(t) from January 2001 to December 2001.

FIG. 4 is a table showing one example of operating main machine record figures y(t) from January 2001 to December 2001.

FIG. 7 is a table showing correspondences between sales areas and supply models.

FIG. 15 is a table showing monthly installed machine figures and installed machine total figures in the present embodiment.

FIG. 17 shows a module structure of a program of the present invention.

FIG. 22 is a table showing forecast methods of supply initial demand forecast, competitor reflected supply demand forecast, and supply demand forecast, and conditions for switching forecast methods.

FIGS. 30A, 30B, 30C and 30D are diagrams showing a transition of databases at the time of supply initial demand forecast.

FIGS. 31A, 31B, 31C, 31D, 31E and 31F are diagrams showing a transition of databases at the time of competitor reflected supply demand forecast.

FIGS. 32A, 32B, 32C and 32D are diagrams showing a transition of databases at the time of supply trend demand forecast.

FIGS. 33A, 33B, 33C, 33D and 33E are diagrams showing a transition at the time of determination of the forecast method.

FIGS. 34A, 34B, 34C, 34D, 34E, 34F, 34G and 34H are diagrams showing various types of databases of the present invention.

FIGS. 35A, 35B, 35C, 35D and 35E are diagrams showing various types of databases of the present invention.

FIG. 36 is a diagram showing examples of a supply sales record (RC) and a competitor reflected supply forecast object term (T(FC5)).

FIG. 40 is a detailed view of a flow of supply macro demand forecast.

FIGS. 41A, 41B, 41C and 41D are transition diagrams of DBs of a supply macro composition module 3803.

FIGS. 42A, 42B and 42C are transition diagrams of DBs of a supply macro decomposition module 3805.

FIGS. 43A, 43B, 43C, 43D and 43E are diagrams showing a list of databases relating to supply macro demand forecast.

DESCRIPTION OF THE PREFERRED EMBODIMENT

Figure 5:
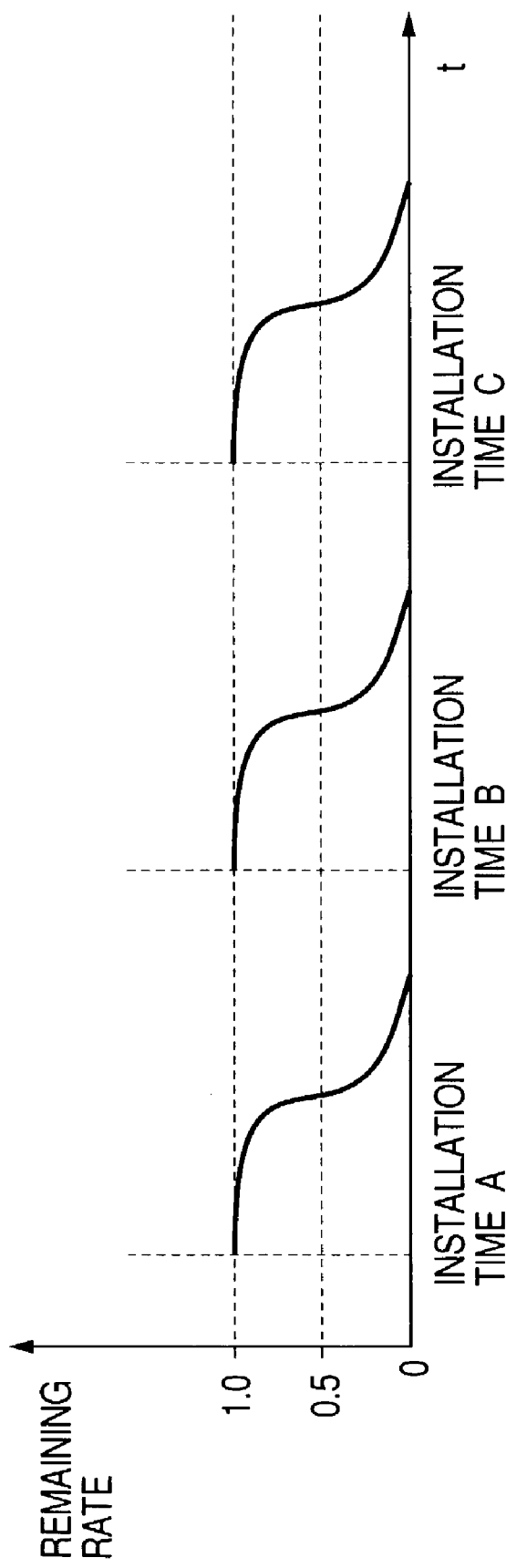
FIG. 5 is a graph showing remaining rate functions at installation time A, installation time B, installation time C.

An object of the present invention is to establish a demand forecast method of a supply relating to a main machine which has not been conventionally realized, and to carry out schedule work-out support (a new product introducing schedule or a replacing (exchanging) schedule) of a supply business on the basis of the result.

In order to realize those objects, there are following technical topics.

(1) A method for forecasting operating figures of main machines in which the supply is used.

(2) A method for forecasting an average print volume (hereinafter "PV") of the main machines in which the supply is used.

(3) A method for forecasting the total PV of the main machines in which the supply is used.

(4) A method for forecasting figures of the supply which will be used in the future from record figures of sales of the supply in the past and the total forecast PV of the main machines in which the supply is used.

(5) A method for forecasting operating figures of the main machines when sufficient sales records do not exist (scheduling stage or a stage immediately after starting).

(6) A method for forecasting the average PV of the main machines when sufficient sales records do not exist.

(7) A method for determining the endurance print volume of the supply when sufficient sales records do not exist.

(8) A method for compensating (increasing or decreasing) the forecast result in consideration of the market trends.

(9) A method for carrying out correction of seasonal variations on the forecast result.

In the present embodiment, the main machines are a copy machine and a printer, and the supplies are paper, toner, and a drum used in the copy machine and the printer. However, the main machine may be a vehicle, and the supply may be gasoline (fuel) used in the car.

The present embodiment has the following structure.
1. System configuration
2. Main machine average PV (print volume) forecast (average PV forecast block)
3. Main machine total PV forecast (total forecast PV block)
4. Supply demand forecast (supply forecast block)
5. Forecast result display
6. Forecast method switching
7. Supply macro demand forecast Hereinafter, in accordance with the attached figures, a preferred embodiment relating to the present invention will be described in detail.

1. System Configuration

FIG. 1 is a diagram showing a configuration of an information processing device for realizing the present invention.

Reference numeral 101 is a CPU, and carries out controls of the respective units in the information processing device, and carries out controls for realizing the processes shown in the present embodiment.

Reference numeral 102 is an input unit, and enables input of information from an operator of the information processing device. As the input unit 102, there are, for example, a keyboard, a mouse, a digitizer, or the like.

Reference numeral 103 is an output unit, and displays information to the operator of the information processing device. As the output unit 103, there are, for example, a CRT, a liquid crystal display, or the like. The output unit 103 displays information urging the operator to input various types of information, and displays forecast results which will be described later as graphs and/or tables.

Reference numeral 104 is an external storage device, and carries out reading and writing of information to a medium other than the information processing device. As the external storage device 104, there are, for example, an FD drive, an MO drive, a CD-R drive, or the like.

Reference numeral 105 is a ROM (Read Only Memory), and is a read only memory. As the ROM 105, there are a PROM (Programmable Rom) in which a user can electrically write a program, and a mask ROM in which contents are written at the time of manufacture. Any ROM may be used in the present embodiment.

Reference numeral 106 is a RAM (Random Access Memory), and is a memory which can be freely written and freely read. The RAM 106 has a function of temporarily storing data at the time of carrying out the processes of the present embodiment or the like.

Reference numeral 107 is a network interface, and enable connection to a network such as the Internet, a LAN/WAN, or the like. As the network interface 107, there are, for example, a modem, a network card, or the like. Further, communication is realized by a network protocol such as TCP/IP or the like.

Reference numeral 108 is an internal storage device, and is a device for storing information in the information processing device. As an example of the internal storage device, there is a hard disk or the like.

Reference numeral 109 is a bus, and exchanges various types of data among the respective blocks in the information processing device and supplies electric power. The bus 109 is formed from an address line, a data line, a control line, a power source/ground line, or the like.

Hereinafter, operations of the respective units in the information processing device will be described.

First, the CPU 101 reads into the RAM 106 a program (hereinafter, "program") which has been stored in the ROM 105, the internal storage device 108, or the external storage device 104, and which realizes the processes (functions) shown in the present embodiment. Further, the program read into the RAM 106 is expanded on the RAM 106. The program may be an interpreter type or may be a compiling type.

The program expanded on the RAM 106 realizes various types of processes by co-operating with the CPU 101.

FIG. 17 shows a modular structure of the program.

The program can be broadly divided into an "input control module", a "computation module", an "output module", a "network module", and the like. The respective modules are divided into further subdivided modules.

The processes of the invention of the present application by the program are concretely realized by using hardware resources such as the CPU 101, the RAM 106, or the like. Namely, due to the program being read by the information processing device, a unique information processing device corresponding to the object of the invention of the present application or an operating method therefor is structured by a concrete means in which the software and the hardware resources co-operate.

Further, the program does not have to be a single program, and may be a combination of a plurality of programs. For example, the processes of the invention of the present application may be realized by a program utilizing a part of functions of a general purpose spreadsheet software (for example, a macro program or the like).

The CPU 101 urges the user to input via the output unit 103 by co-operating with the input control module in the program, and realizes inputting of data from the user via the input unit 102, and makes the external storage device 104, the RAM 106, the internal storage device 108 or the like store the inputted data.

Further, the CPU 101 executes various types of computations required for the processes of the invention of the present application (for example, computation forecasting consumption figures of the supply, or the like) by co-operating with the computation module in the program.

Furthermore, the CPU 101 displays to the user various types of information (for example, an input request, a computed result, or the like) via the output unit 103 by co-operating with the output module in the program.

Moreover, the CPU 101, by co-operating with the network module in the program, realizes connection with a network (not shown) such as a LAN, a WAN, or the like, and realizes exchange of various types of data with external devices via the network.

It goes without saying that the structure of the program is not limited to the above-described program modules.

In forecasting the sales figures (demand figures) of a supply of the main machine in the present invention, a total forecast PV is determined (total forecast PV block) on the basis of a forecast of operating figures of the main machines using the supply (operating main machine figure forecast block) and a forecast of the average PV (average PV forecast block), and demand forecasting of the supply (supply forecast block) is carried out by using the total forecast PV.

Figure 12:
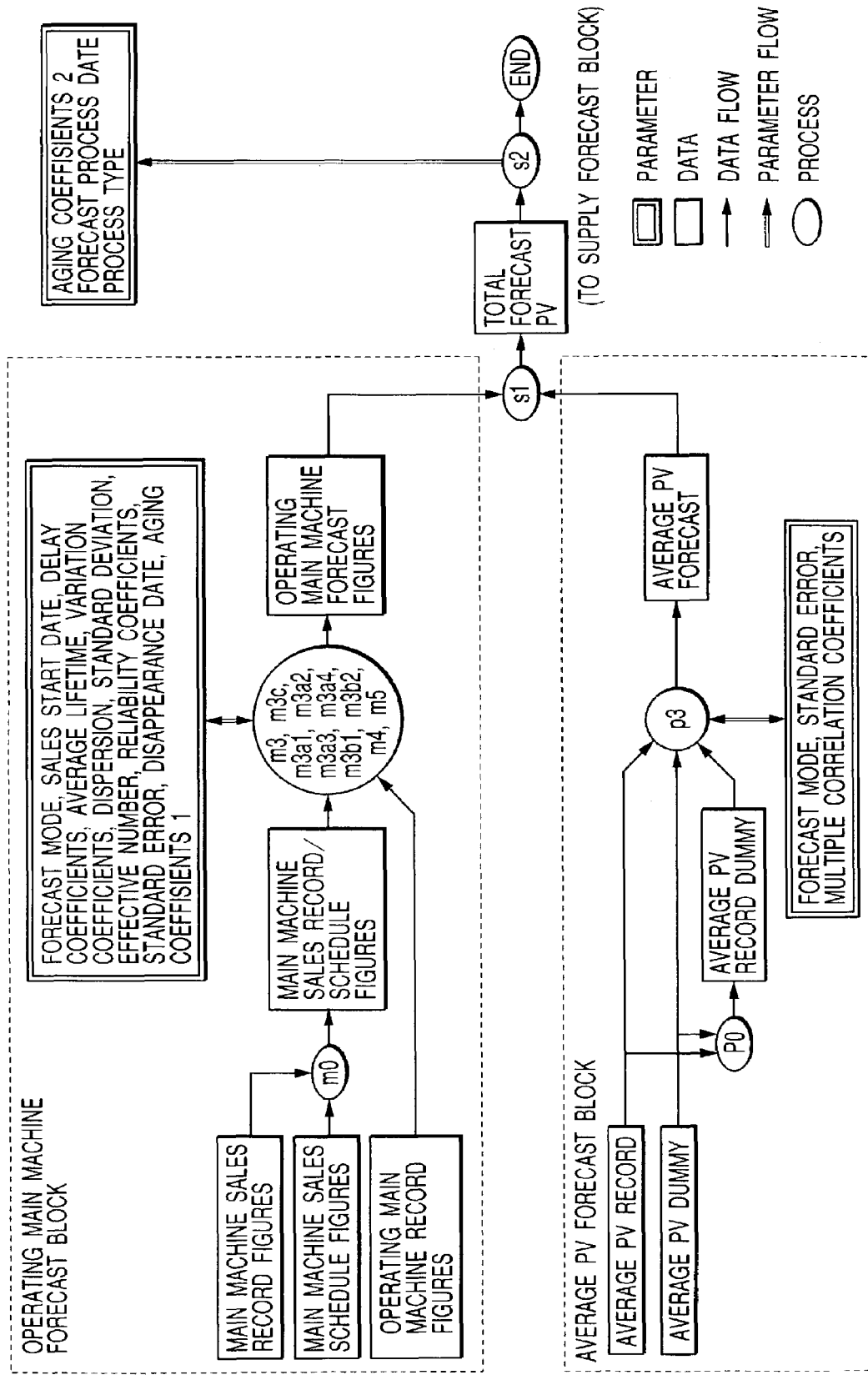
FIG. 12 is a diagram showing an operating main machine forecast block, an average PV forecast block, and a total forecast PV block.

FIG. 12 is a diagram showing the operating main machine figure forecast block, the average PV forecast block, and the total forecast PV block.

Figure 13:
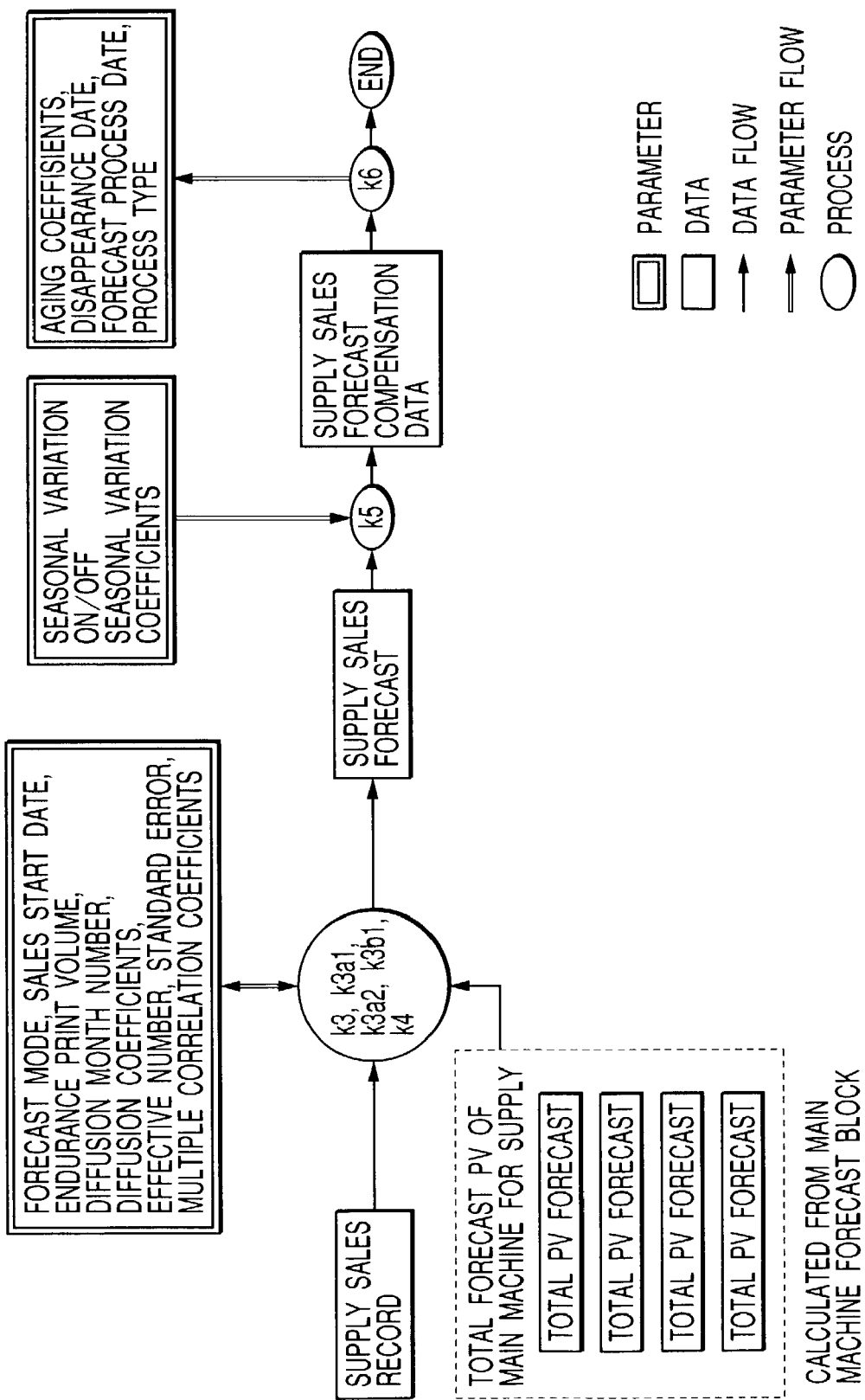
FIG. 13 is a diagram showing a supply forecast block.

FIG. 13 is a diagram showing the supply forecast block.

Hereinafter, the respective forecast blocks will be described.

1. Forecasting of Operating Figure of Main Machines (Operating Main Machine Figure Forecast Block)

Figure 8:
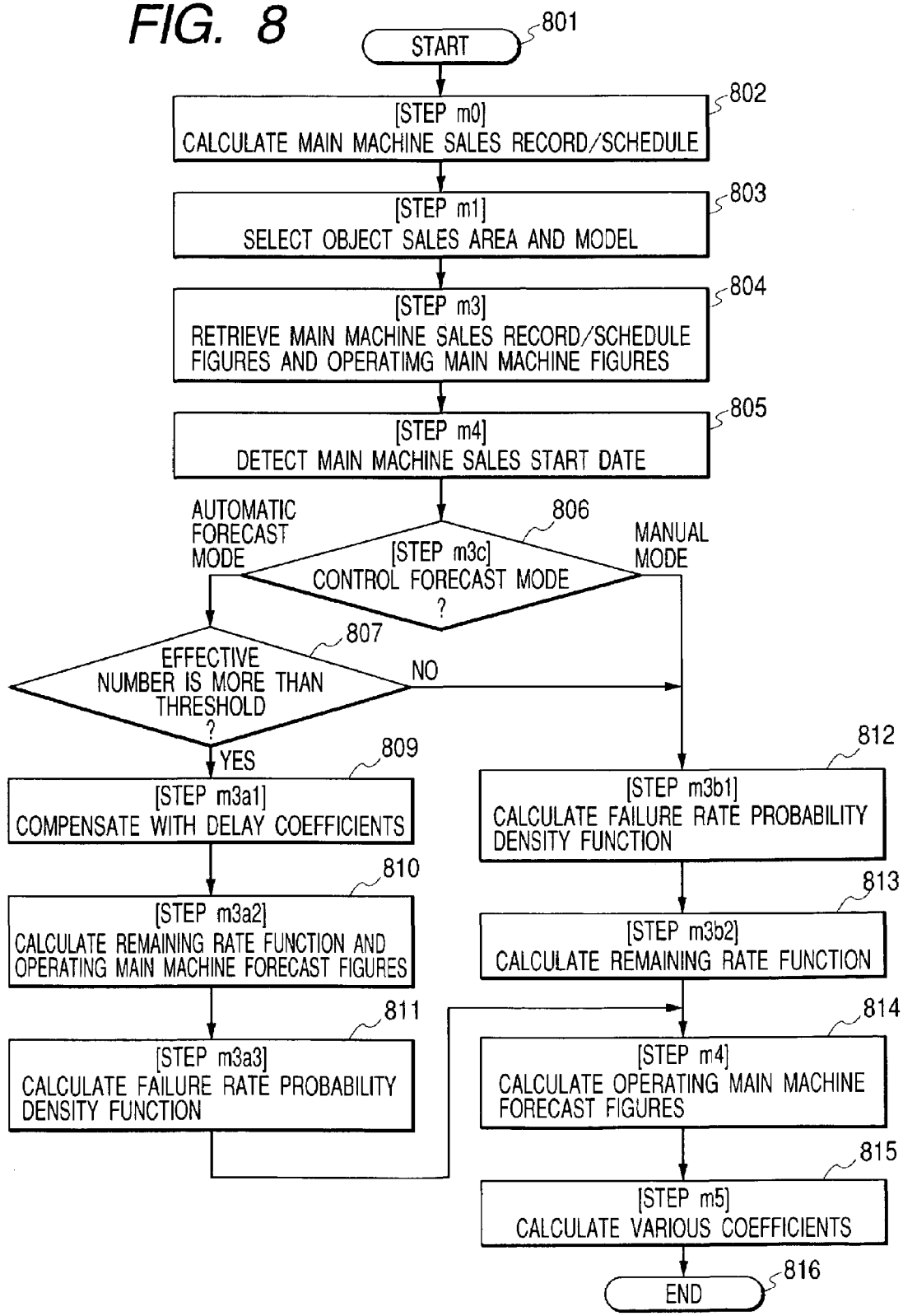
FIG. 8 is a flowchart showing a process flow at the time of forecasting operating figures of the main machines.

FIG. 8 is a flowchart showing a process flow at the time of forecasting the operating figure of the main machines.

Constants, variables, and functions used in the present process are as follows.

t: Unit-time in which data was observed (for example, month), and here, the main machine sales start date is 0 (starting point).

a(t): Main machine sales record figure of t month b(t): Main machine sales schedule figure of t month x(t): Main machine sales record/schedule figure of t month d: Delay coefficient (for example, the number of months)

y(t): Operating main machine record figure of t month

T: The last month when operating main machine record figure was observed (term and effective number in which y(t) was observed)

$\hat{y}(t)$: Operating main machine forecast figure of t month

S(j): Remaining rate function (remaining rate j months after installation of the main machines)

f(t): Failure rate probability density function of main machines (failure rate probability in the unit-time j months after installation of the main machines)

J(t): Installation diffusion coefficient

μ: Average lifetime of the main machine

σ: Standard deviation of average lifetime of the main machine

φ: Variation coefficient of average lifetime of the main machine h: Reliability coefficient of operating main machines forecast figure s: Standard error in operating main machines forecast figure Ag: Aging coefficient Ed: Main machine disappearance date Hereinafter, forecasting of the operating main machine figure will be described.

The forecasting of the operating main machine figure is executed for each forecast process unit. The forecast process unit is a unit divided into each product and geographical area. The forecast process unit is inputted in advance via the input unit 102 by the user (it goes without saying that the main body urging the user to input or transmitting the inputted data to the respective units in the information processing device is the CPU 101), and is stored in the RAM 106. Further, a forecast process unit which has been stored in advance in the external storage device 104 or the internal storage device 108 may be used.

FIG. 2 is a diagram showing a table for explanation of the forecast process units in the present embodiment.

In FIG. 2, the products are the four products of copy machine A, copy machine B, printer A, and printer B, and the geographical areas are the five countries of Japan, the US, England, Germany, and France. In the present embodiment, the geographical areas are set in units of countries, but may be set in units of local governments or in units of geographical areas served by a sales company. Hereinafter, the products are called "product models", and the unit of the geographical area is called a "sales area".

In FIG. 2, the forecast process units denoted by "○"s show that the products are sold in the sales areas. That is, all of the products are merchandised in Japan. However, only copy machine A and printer B are sold in England.

Hereinafter, the procedure of forecasting the operating main machine figure for each forecast process unit will be shown. (step m0) Main machine sales record/schedule figure calculating step (S802)

In this step, the main machine sales record/schedule figure x(t) is generated from the main machine sales record figures a(t) or the main machine sales schedule figures b(t).

First, the data of the main machine sales record figures a(t) and the main machine sales schedule figures b(t) are inputted. Here, "input" means:

A. input of data via the input unit 102 by the user;

B. input of data stored in the external storage device 104 or the internal storage device 108; or C. input of data received via a network from an external device by the network interface 107. The functions of the "input" are realized by the CPU 101 or the like on the basis of the program. The input may be carried out on the basis of instructions of the user, or may be realized by a fixed rule (for example, periodically) on the basis of the program. Hereinafter, unless otherwise noted, "input" means inputting by the above-described A, B, C.

The main machine sales record figures a(t) and the main machine sales schedule figures b(t) inputted are stored in the RAM 106. Further, on the basis of the computation module in the program, the following computing process is carried out by the CPU 101.

$$a(t)=\text{null then } x(t)=b(t)$$
$$a(t)\neq\text{null then } x(t)=a(t) \quad \text{(Formula 1)}$$

Note that the main machine sales record figures a(t) can obtain a substantially accurate transition of the sales figures for each forecast process unit by referring to data of actual sales of a sales store, a dealer, or the like. Further, the main machine sales schedule figures b(t) are the transition of scheduled values of the sales figures determined from the market target, the economic situations, and the like.

FIG. 3 is a table showing one example in which the main machine sales record/schedule figures x(t) are calculated from the main machine sales record figures a(t) and the main machine sales schedule figures b(t) from January 2001 to December 2001.

From February to August of 2001, because the main machine sales record figures a(t) have values, the main machine sales record/schedule figures x(t) are a(t). On the other hand, after September 2001, because the main machine sales record figures a(t) have no values (null), the main machine sales record/schedule figures x(t) are the main machine schedule figures b(t).

In this way, it is one of the features of the present invention that subsequent forecasting is carried out by using the main machine sales record/schedule figures x(t) in which the main machine sales record figures a(t) and the main machine sales schedule figures b(t) are combined.

The present step will be described in further detail. In the present step, the record data is given priority over the schedule data.

Switching of the main machine sales record figures a(t) and the main machine sales schedule figures b(t) may be considered as being based on time. For example, it can be considered that "The main machine sales record/schedule figures x(t) are the main machine sales record figures a(t) before September 2001, and the main machine sales record/schedule figures x(t) are the main machine sales schedule figures b(t) after October 2001". However, problems arise in a process based on time, due to the time lag caused by the time taken to acquire data or the like. In particular, when data from foreign countries is dealt with, the lag in time for acquiring data is marked.

Therefore, in the invention of the present application, by discriminating (switching) on the basis of "there are"/"there are no" main machine sales record figures a(t) as in formula 1, the above-described problem can be solved.

(step m1) Object Sales Area and Object Model Selecting Step (S803)

The above-described forecast process units (sales areas/main body models) are selected. In the present embodiment, in order to simplify, the forecast process is carried out by focusing on one forecast process unit. However, the forecast process units to be selected may be plural (a method in which, after a plurality of forecast process units are collectively forecasted, the forecast results are divided so as to calculate the forecast result for each forecast process unit will be described later).

"Selection" of the forecast process unit is, in the same way as in the case of the above-described "input", realized by any method of the A, B, C by the CPU 101 or the like on the basis of instructions of the program.

(Step m2) Main Machine Sales Record/Schedule Figures x(t) and Operating Main Machine Record Figures y(t) Reading Step (S804)

The main machine sales record/schedule figures x(t) and the operating main machine record figures y(t) stored in time series are read into the RAM 106 for each forecast process unit (1 main machine model/1 sales area). The operating main machine record figure y(t) is the operating situation of the main machine (operating figure) which is confirmed when a service engineer visits customers for maintenance, or the like. Inputting of the operating main machine record figures y(t) is, in the same way as in the case of the above-described "input", realized by any method of the A, B, C by the CPU 101 or the like on the basis of the program. The read data are used at the time of calculating the operating main machine forecast figure which will be described later.

(Step m3) Main Machine Sales Start Date Detecting Step (S805)

The sales start date of the main machines is detected.

The CPU 101 searches the main machine sales record/schedule figures x(t) stored in the RAM 106 from the beginning (searches from the left in FIG. 3), and stores the time when a value other than 0 is first detected as the starting point (t=0) of an address in the RAM 106. Taking FIG. 3 as an example, February 2001 is the starting point of the address.

FIG. 4 is a table showing one example of the operating main machine record figures y(t) from January 2001 to December 2001.

The CPU 101 searches the operating main machine record figures y(t) stored in the RAM 106 from the end (searches from the right in FIG. 4), and, when a value other than 0 or null is first detected, sets an effective number T which can be counted from the starting point (t=0) of the address, and stores the effective number T in the RAM 106.

As is known from FIG. 4, because the time when a value other than 0 is first detected in the operating main machine record figures y(t) is July 2001, if the starting point of the address is February 2001, the effective number T is 6.

(Step m3c) Forecast Mode Control Step (S806)

One forecast method is selected from two forecast methods.

(Forecast method 1) Steps m3a1, m3a2, m3a3, and m3a4 are executed.

(Forecast method 2) Steps m3b1 and m3b2 are executed.

As will be described later, because forecast method 1 requires a certain number of data such as the main machine sales record/schedule figures x(t), the operating main machine record figures y(t), or the like, forecast method 1 is not suited to a case in which there is little data, and there are a large number of cases to which forecast method of forecast method 2 is suited. The forecast method may be set in advance (manual forecast mode), or, as follows, the forecast method may be automatically selected (automatic forecast mode).

In other words, when the effective number T stored in the RAM 106 is equal to or greater than a threshold value N, the CPU 101 selects forecast method 1 by judging that there are sufficient data for forecast method 1. On the other hand, when the effective number T is less than or equal to the threshold value N, the CPU 101 selects the forecast method 2 by judging that there is not sufficient data for forecast method 1 (S807). The threshold value N has been stored in advance in the RAM 106 via the input unit 102 or the network interface 107 by the user.

For example, when N=24, if the effective number T is equal to or greater than 24, forecast method 1 is selected, and if the effective number T is less than 24, forecast method 2 is selected.

There are a large number of cases in which forecast method 2 is selected when sufficient data cannot be obtained or at the time of simulation at the sales scheduling stage.

Generally, forecast method 1 has a higher accuracy of forecast than forecast method 2. In such a case, forecast method 2 is forcibly selected as a manual forecast mode. However, in certain cases, even when there is sufficient data, there are cases in which the accuracy of forecast method 2 is higher than that of forecast method 1. In such cases, the manual forecast mode or the automatic forecast mode is appropriately used.

(Step m3a1) Compensating Step by Delay Coefficient (Forecast Method 1) (S809)

A time difference (delay coefficient) arises from the time of actual sale of the main machine to the time of installing (operating) the main machine. Namely, there is a delay coefficient d between the main machine sales record/schedule figure x(t) and the main machine sales record figure y(t). If this time difference is considered, a more accurate forecast is possible.

Hereinafter, a method for calculating the delay coefficient d will be described.

First, the install diffusion coefficient J(t) is set.

Figure 14:
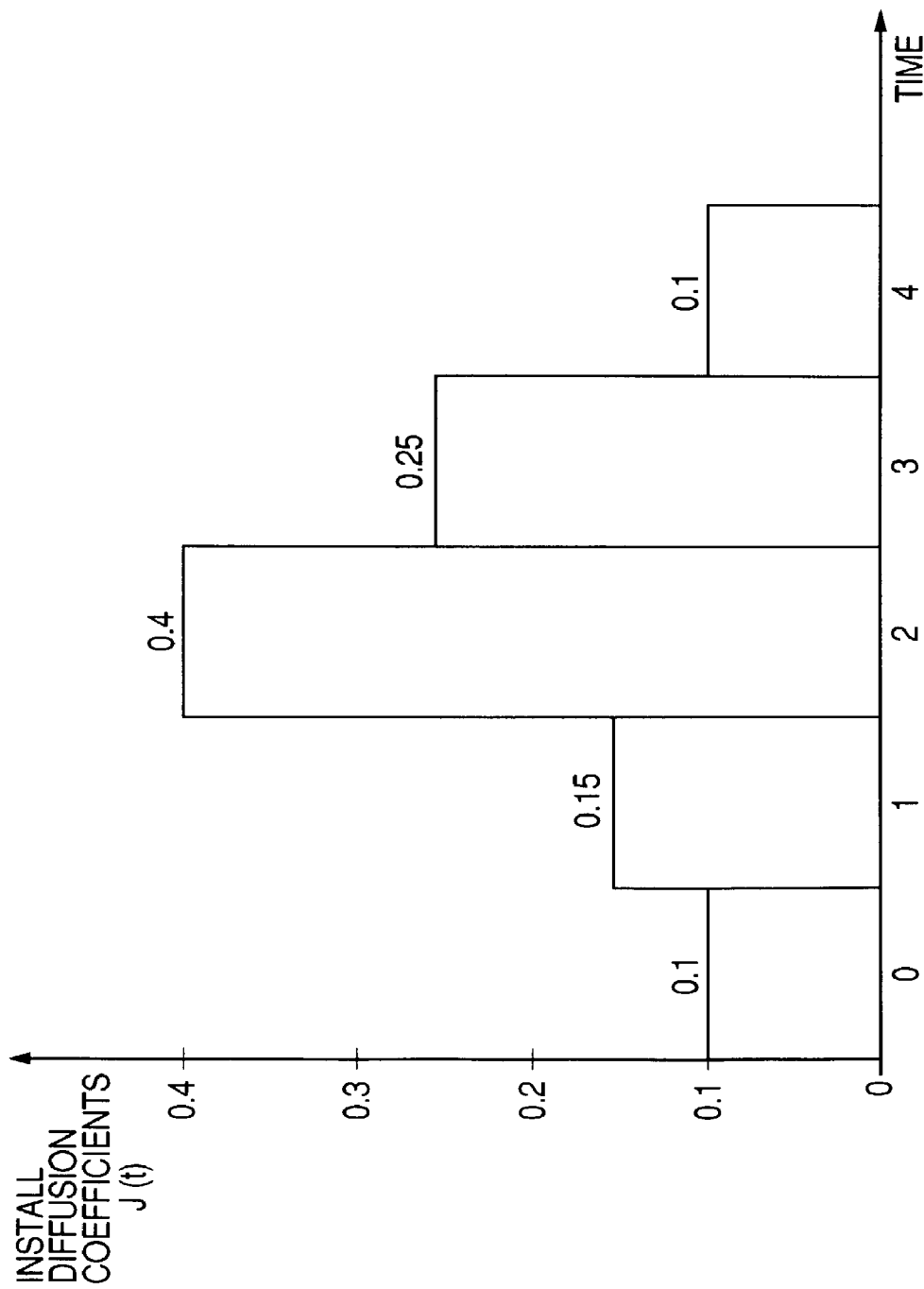
FIG. 14 shows one example of install diffusion coefficients j(t).

FIG. 14 shows one example of the install diffusion coefficients J(t) inputted in advance in the RAM 106. The abscissa is time, and the ordinate shows the install diffusion coefficients J(t). In the present embodiment, the time of the abscissa is in units of months, but it goes without saying that the time may be in units of years, in units of weeks, or in units of days.

The install diffusion coefficient J(t) shows the probability of time in which the main machine sales record/schedule figures x(t) will be installed in the future. Therefore, by multiplying the main machine sales record/schedule figure x(t) of each month and the install diffusion coefficient J(t) stored in the RAM 106 by the CPU 101, it can be known whether the main machines which were sole (were scheduled to be sold) in that month are installed. The time integral of the install diffusion coefficient J(t) is 1.

FIG. 15 is a table showing monthly installed machine figures and installed machine total figures in the present embodiment.

July 2001 will be described as an example. The main machine sales record/schedule figure x(t) of July 2001 is 53. All these 53 machines are not installed in the market immediately after being sold, and are gradually installed over time. The install diffusion coefficient J(t) expresses this state. Because the install diffusion coefficient J(t) of one month after sale is 0.1, it can be supposed that 10 percent of the 53 machines (5.3 machines) will be installed. Because the install diffusion coefficient J(t) of two months later is 0.15, it can be supposed that 7.95 machines will be installed in this term among the 53 machines. In the same way, the number of machines which will be installed in the third month and months thereafter as well are calculated.

A similar calculation is applied to the monthly main machine sales record/schedule figures x(t). Further, for each month, the installed machine total figure is determined by totaling up the installed machine figures.

An arbitrary fixed point is then determined. For example, June is the fixed point. 68 which is the main machine sales record/schedule figures x(t) of June is smaller than 111.1 which is the installed machine total figure. This means that the actual operating figures do not follow the forecast figures. Next, the installed machine total figures is shifted by one month in the future direction, and it is used as the temporary installed machine total figure. The temporary installed machine total figure of June becomes 66.45, and 68 which is the main machine sales record figure y(t) followed 66.45 which is the installed machine total figure (forecast figure). The one month which is the shifting amount is the time difference (delay coefficient) d.

The x(t) is shifted in the future direction (the direction in which t increases) by a time difference d determined from the main machine sales record/schedule figures x(t) and the operating main machine record figures y(t). The shifted value newly serves as x(t), and by executing following forecast process, a more accurate forecast is possible. It goes without saying that the process computing the time differenced and the shifted x(t) is carried out by the CPU 101 on the basis of the program.

The shifted x(t) is defined thereafter as the installed figure.

(Step m3a2) Remaining Rate Function Calculating Step and Operating Main Machine Forecast Figure Calculating Step (Forecast Method 1) (S810)

The remaining rate function S(t) is determined. The remaining rate function S(t) is a function showing the rate of the operating main machine figure t months later with respect to the installed main machine figure. When all of the installed main machines are operating, the remaining rate is 1, and when half of the installed main machines are operating, the remaining rate is 0.5.

FIG. 5 is a graph showing remaining rate functions at installation time A, installation time B, and installation time C.

The abscissa of FIG. 5 is time t, and the ordinate shows the remaining rate. The concept of the forecast method of the operating figure here is that the same main machine model of the same sales area (forecast process unit) remains at "the same" remaining rate regardless of when it was installed. That is, although the same main machine model of the same sales area is respectively installed at different times which are installation time A, installation time B, and installation time C, the remaining rate functions thereof are common.

Accordingly, the operating main machine figure at t is the sum of the remaining number of machines of the previous installed number of machines. This relationship is also established in the sales figures in sales scheduling. Accordingly, the operating main machine record figure y(t) at time t can be expressed by the following formula.

$$y(t) = \int_0^t S(t-\tau)x(\tau)d\tau + e(t) \qquad \text{(Formula 2)}$$

e(t) is the error at time t. Because the operating main machine record figures y(t) and the main machine sales record/schedule figures x(t) are already known up to the effective number T, Se expressing the sum of squares of the error e(t) is expressed as follows.

$$Se = \int_0^T e(t)^2 dt = \int_0^T \left( y(t) - \int_0^t S(t-\tau)x(\tau)d\tau \right)^2 dt \qquad \text{(Formula 3)}$$

Further, a remaining rate function S(t) making the sum of squares of error Se be a minimum is analytically or numerically determined. There are a large number of cases in which it is difficult to analytically determine the remaining rate function S(t) by formula 3, and generally, for example, $$S(t) = e^{\omega t^r}$$

and constants ω and r are determined by numerical calculation. In this case, the remaining rate function S(t) is not limited to the function, and may be any function provided that it is a function which is suited to the object model.

The above-described process is realized as follows by the CPU 101 in accordance with the program. Namely, the CPU 101 sets the above-described formula (formula 3) on the RAM 106 on the basis of the operating main machine record figures y(t), the remaining rate function S(t), and the main machine sales record/schedule figures x(t) stored in the RAM 106. Further, a scale width t required for the numerical calculation is set, and S(t) is determined by the numerical calculation such that the sum of squares Se of the error becomes a minimum when calculation is carried out from time 0 to T.

Figure 6:
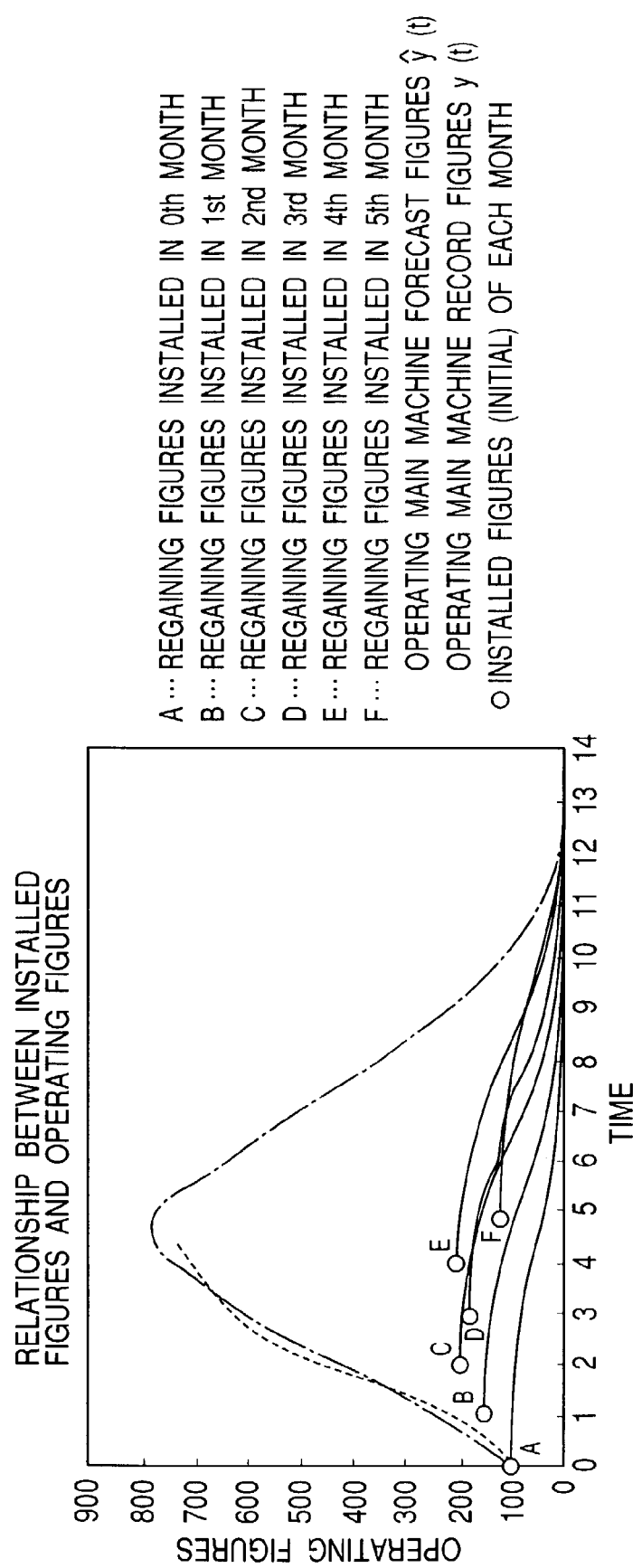
FIG. 6 is a graph showing relationships between installed main machine figures and operating main machine figures.

FIG. 6 is a graph showing the relationships of the installed main machine figures and the operating main machine figures.

The line shown by the broken line in the figure shows the operating main machine record figures y(t). Further, the starting points of the lines which extend while attenuating and whose starting points are the respective months, are respectively the installed figures of the respective months. On the basis of formula 3, the remaining rate function S(t) making the sum of squares Se of the error be a minimum is determined, and the remaining number of machines is determined from the remaining rate function S(t) and the main machine sales record/schedule figure x(t).

In accordance with this forecast method (forecast method 1), when there are sufficient main machine sales record/schedule figures x(t), an extremely accurate and stable forecast is possible.

(Step m3a3) Failure Rate Probability Density Function Calculating Step (Forecast Method 1) (S811)

A failure rate probability density function f(t) is determined. The failure rate probability density function is a function in which a failure total function (F(t)=1−S(t)) is differentiated by time, and is given by the following formula.

$$f(t) = -\frac{dS(t)}{dt} \qquad \text{(Formula 4)}$$

The CPU 101 computes the remaining rate function S(t) on the basis of the S(t) computed at (Step m3a2) stored in the RAM 106. The failure rate probability density function f(t) is a function showing the disappearance rate of the main machines in the market.

(Step m3a4) Average Lifetime, Standard Deviation, and Variation Coefficient Calculating Step (Forecast Method 1)

An average lifetime μ, a standard deviation σ of the average lifetime, and a variation coefficient φ of the average lifetime are determined.

$$\mu = \int_0^\infty t f(t) dt \qquad \text{(Formula 5)}$$

$$\sigma = \sqrt{\int_0^\infty (t-\mu)^2 f(t) dt} \qquad \text{(Formula 6)}$$

$$\phi = \frac{\sigma}{\mu} \qquad \text{(Formula 7)}$$

These average lifetime μ, standard deviation σ of the average lifetime, and variation coefficient φ of the average lifetime are successively computed by the CPU 101 on the basis of the failure rate probability density function f(t) stored in the RAM 106. These values are values showing the disappearance state of the main machines, and are utilized for development, production, marketing, or the like.

Figure 16:
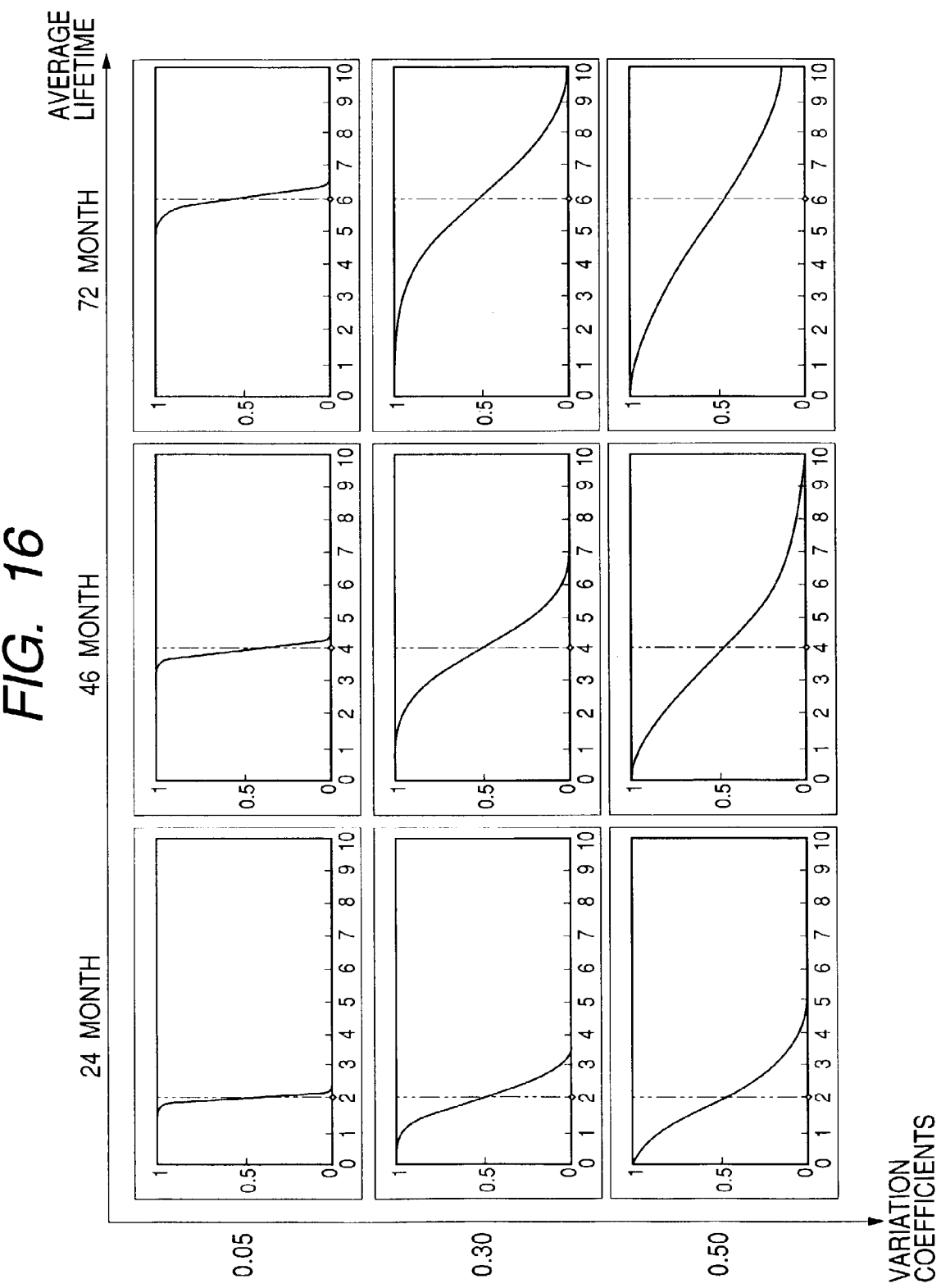
FIG. 16 is one example showing changes in the remaining rate function when an average lifetime μ and a variation coefficient φ are varied.

FIG. 16 is one example showing changes in the remaining rate functions when the average lifetime μ and the variation coefficient φ are changed.

It is known that the larger the average lifetime μ which is the ordinate in the figure, the larger the lifetime of the main machine.

It is known that the larger the variation coefficient φ which is the abscissa in the figure, the more the remaining rate function becomes flat and smoothly disappears. On the other hand, it is known that the smaller the variation coefficient φ, the more the change in the remaining rate function is steep and suddenly disappears at a given point in time.

In this way, by investigating the average lifetime μ and the variation coefficient φ, the evaluation of the performance of the main machine (how does it disappear), the introduction timing of a new product, the timing of replacement, or the like can be investigated, and strategic business is possible.

Hereinafter, the feature of the present invention will be again described. The present invention has a feature which is not the forecast of "sales figures", but the forecast of "operating figures". This has an effect in businesses in which a profit is made by maintenance after a main machine such as a printer, a copy machine, or the like is sold (businesses targeting the after market).

(Step m3b1) Failure Rate Probability Density Function Calculating Step (Forecast Method 2) (S812)

Generally, when there is not a sufficient number of data of the main machine sales record/schedule figures x(t), the accuracy and stability of the forecast are not good. In this case, the above-described failure rate probability density function is determined from parameters set in advance.

The parameters required for calculation of the failure rate probability density function are the average lifetime μ and the variation coefficient φ of the average lifetime (or the standard deviation σ of the average lifetime). These parameters are inputted by any of the methods of the A, B, C.

Further, the main machine sales record/schedule figures x(t) are shifted (compensated) in the future direction by the delay coefficient d, and are newly set as the installed figures x(t).

The delay coefficient d is inputted by any of the methods of the A, B, C.

The CPU 101 then determines the failure rate probability density function f(t) by numerical calculation from formula 4 through formula 7 on the basis of μ and φ (or σ) inputted and stored in the RAM 106.

(Step m3b2) Remaining Rate Function Calculating Step (Forecast Method 2) (S814)

As is clear from formula 4, the CPU 101 determines the remaining rate function S(t) from the failure rate probability density function f(t) by using the following formula.

$$S(t) = 1 - \int_0^t f(\tau)d\tau \quad \text{(Formula 8)}$$

$$S(0)=1 \quad \text{(formula 9)}$$

(Step m4) Operating main machine forecast figure calculating step (S814)

As is clear from formula 1, the operating main machine forecast figure $$\hat{y}(t)$$

is as follows.

$$\hat{y}(t) = \int_0^t S(t-\tau)x(\tau)d\tau \quad \text{(Formula 10)}$$

FIG. 6 is a graph showing the relationships of the installed main machine figures and the operating main machine forecast figures/operating main machine record figures.

The line shown by the broken line in the figure shows the operating main machine record figures y(t). Further, the starting points of the lines which extend while attenuating at the respective months are respectively the installed figures x(t) The CPU 101 takes the sum of the remaining number of machines for each month, and uses the sum as the operating main machine forecast figure of each month. This is shown by the one-dot chain line in the figure.

(Step m5) Various Coefficients Calculating Step

The CPU 101 determines a reliability coefficient h of the operating main machine forecast figure, a standard error s, a disappearance date Ed in the market, and an aging coefficient Ag on the basis of the various types of parameters stored in the RAM 106.

$$h = \frac{T}{\mu} \quad \text{(Formula 11)}$$

Generally, the forecast reliability coefficient h is not calculated at the time of manual forecast mode.

The forecast reliability coefficient h is an index expressing stability/accuracy of the forecast model, and if the value is greater than 1, a stable forecast result can be obtained.

Further, the standard error s can be determined by the following formula.

$$s = \sqrt{\frac{1}{T}Se} \quad \text{(Formula 12)}$$

The standard error s is an index expressing the forecast accuracy, and the smaller the value thereof, the better.

The disappearance date Ed in the market expresses the time (date) at which the main machines in the forecast model will probably disappear from the market. The disappearance date is the time at which the operating main machine forecast figure $$\hat{y}(t)$$

becomes 0. However, instead of the time when it becomes 0, the time at which the operating main machine forecast figure $$\hat{y}(t)$$

becomes less than a certain threshold value may be the disappearance time.

The aging coefficient Ag can be determined by following formula.

$$Ag = \frac{\int_0^C \hat{y}(t)dt}{\int_0^\infty \hat{y}(t)dt} \quad \text{(Formula 13)}$$

C is time corresponding to the time when the forecast process is executed. This value is an index showing a state in which the main machine "is aging" in the market. If it is immediately after the main machines are introduced onto the market, the aging coefficient Ag is 0, and if the main machines disappear from the market, the aging coefficient Ag becomes 1.

The aging coefficient Ag is an important index in that it expresses the operating situation of the main machines in the market.

2. Forecast of Main Machine Average PV (Print Volume) (Average PV Forecast Block)

Figure 9:
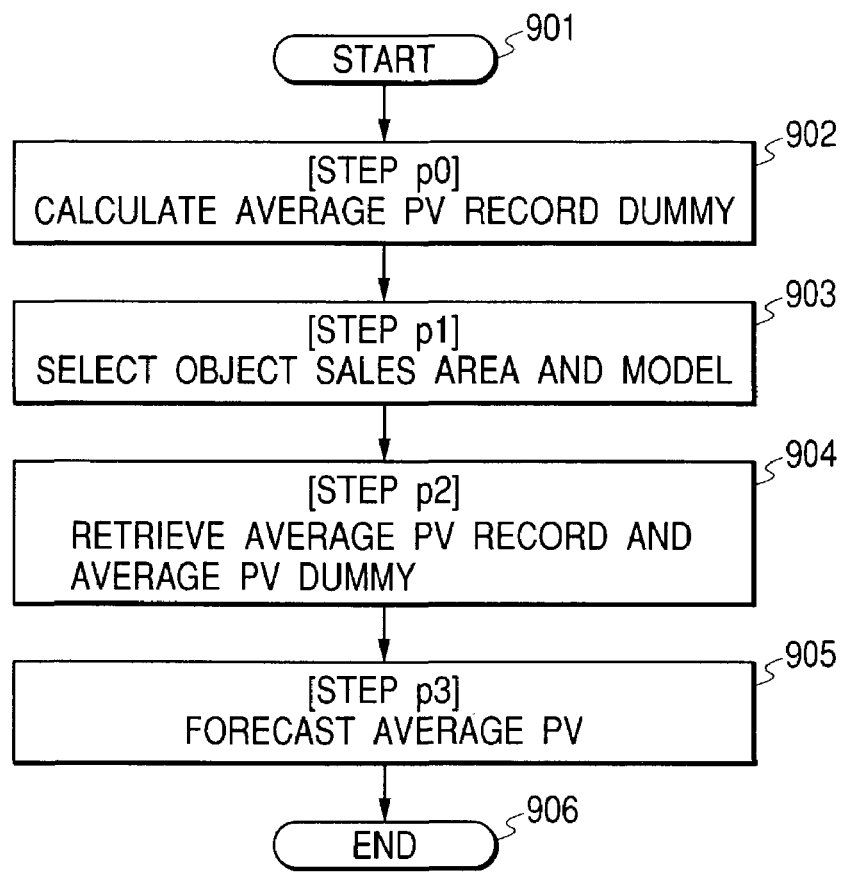
FIG. 9 is a flowchart showing a process flow at the time of forecasting an average PV of the main machines.

FIG. 9 is a flowchart showing a process flow at the time of forecasting an average PV of the main machines.

Constants, variables, and functions used in the present process block are as follows.

t: Unit-time in which data was observed (for example, month), and here, the main machine sales start date is the origin 0.
p(t): Average PV record of t month
q(t): Average PV dummy of t month
v(t): Average PV record dummy of t month
$\hat{v}(t)$: Average PV forecast of t month
R: Multiple correlation coefficient
s: Standard error (Step p0) Average PV Record Dummy Calculating Step (S902)

The CPU 101 generates the average PV record dummy v(t) on the basis of the following formula from the average PV record p(t) and the average PV dummy q(t) inputted and stored in the RAM 106.

if p(t)=null then v(t)=q(t)

if p(t)≠null then v(t)=p(t)     (Formula 14)

The average PV record p(t) can be obtained by a service engineer visiting a customer and confirming. When there are no records or even when records exist, the average PV dummy q(t) is set in advance when the data cannot be relied on. Note that the average PV is the print volume of one machine per one unit-time. In the present embodiment, the unit-time is units of months. However, it goes without saying that the unit-time may be units of years, units of weeks, units of days, or the like.

(Step p1) Object Sales Area and Object Model Selecting Step (S903)

In the same way as in step m1, a sales area and a main machine model (forecast process units) for which forecast process is to be executed are selected. The forecast process units which are selected may be plural. The selection is realized by the above-described "input".

(Step p2) Average PV Record and Average PV Dummy Retrieving Step (S904)

In the same way as in step m2, the average PV record p(t) and the average PV dummy q(t) accumulated in time series are read for each forecast process unit. Namely, the average PV record p(t) and the average PV dummy q(t) inputted are stored in the RAM 106.

(Step p3) Average PV Forecasting Step (S905)

Forecasting of the average PV has the following three modes.

(1) Forecast mode 1: Nonlinear regression is applied to the average PV record p(t).
(2) Forecast mode 2: Nonlinear regression is applied to the average PV dummy q(t).
(3) Forecast mode 3: Nonlinear regression is applied to the average PV record dummy v(t).

The most appropriate forecast mode is selected from among the above-described three forecast modes by taking the reliability of the data or the like into consideration. The "selection" may be carried out via the input unit 102 by the user, or may be carried out by the CPU 101 on the basis of a certain condition (for example, the number of data or the like).

As an example, the case of the forecast mode 3 will be described. The average PV record dummy v(t) is the following model formula.

$$v(t) = ae^{bt^r} + e(t) \quad \text{(Formula 15)}$$

It goes without saying that the model formula is not limited to formula 15. e(t) is the error at time t. If it is supposed that T is the effective number of the v(t), the sum of squares Se of the error can be expressed as $$Se = \int_0^T e(t)^2 dt \quad \text{(Formula 16)}$$

and coefficients b, r, a are determined such that the sum of squares Se of the error is made to be a minimum. The CPU 101 determines the coefficients b, r, a by using numerical analysis (for example, the method of least squares). From the determined b, r, a, the average PV forecast $$\hat{v}(t)$$

is as follows.

$$\hat{v}(t) = ae^{bt^r} \quad \text{(Formula 17)}$$

Note that it goes without saying that it may be linear regression in accordance with the model.

(Step p4) Multiple Correlation Coefficient and Standard Error Calculating Step

In order to evaluate the nonlinear regression (linear regression) in step p3, the CPU 101 calculates the multiple correlation coefficient R and the standard error s on the basis of various types of parameters stored in the RAM 106 by using the following formulas.

$$R = \frac{\int_0^T (\hat{v}(t) - \overline{v}(t) - \overline{v}) dt}{\sqrt{\int_0^T (\hat{v}(t) - \overline{v})^2 dt \int_0^T (v(t) - \overline{v})^2 dt}} \quad \text{(Formula 18)}$$

$$\left( \overline{v} = \frac{1}{T} \int_0^T v(t) dt \right) \quad \text{(Formula 19)}$$

$$s = \sqrt{\frac{1}{T} Se} \quad \text{(Formula 20)}$$

(3. Forecast Total PV of Main Machines (Total Forecast PV Block)

Figure 10:
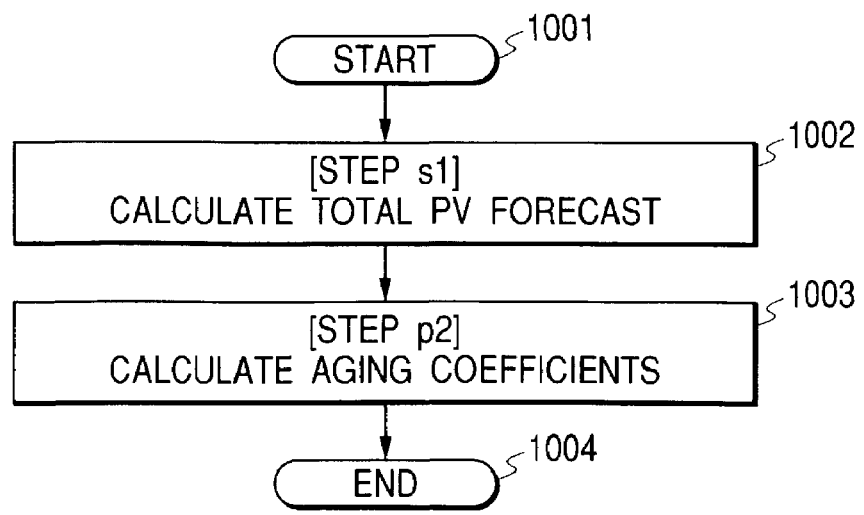
FIG. 10 is a flowchart showing a process flow at the time of forecasting a total PV of the main machines.

FIG. 10 is a flowchart showing a process flow at the time of forecasting the total PV of the main machines.

Constants, variables, and functions used in the present process are as it follows.

t: Unit-time (for example, month)
$\hat{y}(t)$: Operating main machine forecast figure of t month
$\hat{v}(t)$: Average PV forecast of t month
$\hat{V}(t)$: Total PV forecast of t month
Ag: Aging coefficient considering PV (Step s1) Total PV Forecast Calculating Step (S1002)

Average PV forecast $\hat{V}(t)$ may be calculated in time-series based on the following formula.

$$\hat{V}(t) = \hat{v}(t)\hat{y}(t) \quad \text{(Formula 21)}$$

The above-described computation is realized by the CPU 101 on the basis of the parameters stored in the RAM 106.

(Step s2) Aging Coefficient Calculating Step (S1003)

The CPU 101 determines the aging coefficient Ag to which PV is added by using the following formula.

$$Ag = \frac{\int_0^C \hat{V}(t) dt}{\int_0^\infty \hat{V}(t) dt} \quad \text{(Formula 22)}$$

C is a value in which the time (date) of the forecast process day has been converted into an address. The value of the aging coefficient Ag is an index showing the state in which the main machines to which PV is added are aging in the market. If it is a state in which the main machines are first introduced, the aging coefficient Ag is 0, and when the main machines disappear, the aging coefficient Ag is 1.

4. Demand Forecast of Supply (Supply Forecast Block)

Figure 11:
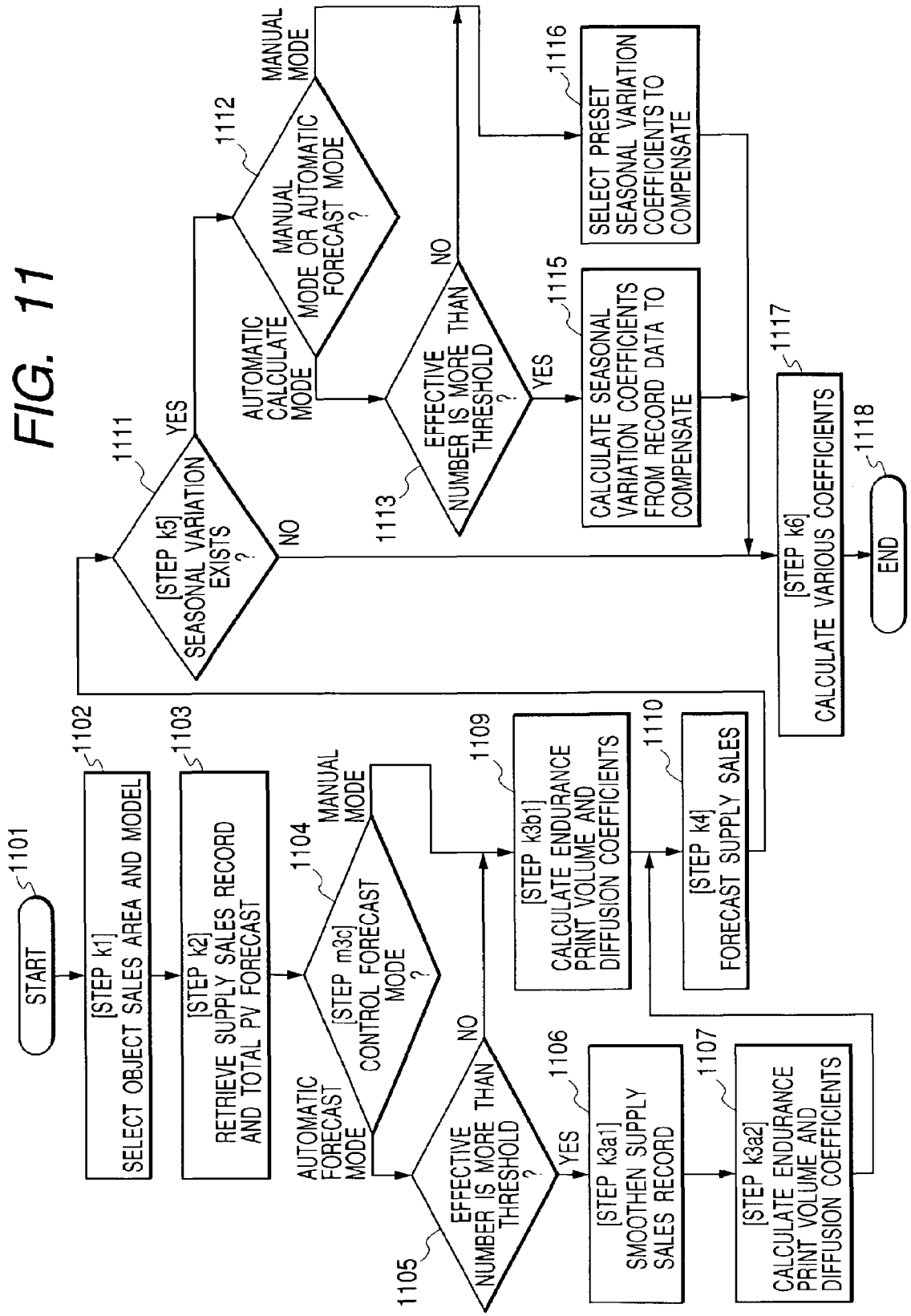
FIG. 11 is a flowchart showing a process flow at the time of carrying out demand forecasting of a supply.

FIG. 11 is a flowchart showing a process flow at the time of forecasting demand for a supply.

Constants, variables, and functions used in the present process are as follows.

t: Unit-time (for example, month)
z(t): Supply sales record of t month
$\hat{z}(t)$: Supply sales forecast of t month
$\hat{V}(t)$: Total PV forecast of t month for a main machine model using a supply model to be forecasted
T: Term in which record data has been observed When $0 \leq t \leq T$, there are records, and when $T \leq t$, there are forecasts C: Endurance print volume
    H: Diffusion range (delay width)
    p(i): Diffusion density coefficient ($0 \leq i \leq H$)
    u(i): Seasonal variation coefficient ($0 \leq i \leq 11$)
    Ed: Disappearance time
    Ag: Aging coefficient
    R: Multiple correlation coefficient
    s: Standard error (Step k1) Object Sales Area and Object Model Selecting Step (S1102)

A sales area and a supply model for which forecast process is to be carried out are selected. The sales area and the supply model which are selected may be plural. The "selection" is realized by any of the methods of the A, B, C.

FIG. 7 is a table showing correspondences of sales areas and the supply models.

"○"s in the figure show that the supply models are sold in the sales areas.

(Step k2) Supply Sales Record and Total PV Forecast Retrieving Step (S1103)

The supply sales record z(t) accumulated in a time series and the total PV forecast of the main machine using the supply $\hat{V}(t)$ are inputted for each one supply model/one sales area (each supply forecast process unit), and are stored in the RAM 106. If the supply of interest is used for a plurality of main machines, the sum of the total PV forecast of each main machine $\hat{V}(t)$ is newly made to be $\hat{V}(t)$ For example, in FIG. 2 and FIG. 7, when copy machine A (201) and printer B (202) utilize a common toner C (707) in Japan, the sales area of the supply forecast process unit is Japan, and the supply model is the toner C, and total PV forecast $\hat{V}(t)$ is a value in which the total PV forecast of copy $\hat{V}(t)$ and the total PV forecast of printer B $\hat{V}(t)$ are added together.

(Step k3) Forecast Mode Control Step (S1104)

In the same way as in a case in which the operating main machine figures are forecasted, one forecast method is selected from the following two forecast methods.

(Forecast Method A) Steps k3a1 and k3a2 are Executed.

(Forecast Method B) Step k3b1 is Executed.

Because forecast mode A requires a certain number of data of the record data, forecast mode A is not suited to a case in which there is little data, and there are a large number of cases in which the forecast method of forecast method 2 is suited. The forecast method may be set in advance (manual forecast mode), or as follows, the forecast method may be automatically selected (automatic forecast mode).

In other words, when the effective number T is equal to or greater than a certain threshold value N, it is judged that there are sufficient data for forecast method 1, and forecast method 1 is selected. On the other hand, when the effective number T is less than the threshold value N, it is judged that there is not sufficient data for forecast method 1, and forecast method 2 is selected (S1105). The judgement is realized by the CPU 101.

For example, with N=24, if the effective number T is 24 or more, forecast method 1 is selected, and if the effective number T is less than 24, forecast method 2 is selected.

Further, in the above-described example, the forecast method is selected in accordance with the effective number T, but the forecast method may be selected by using another parameter.

There are a large number of cases in which forecast method 2 is selected when sufficient data cannot be obtained or at the time of simulation at a sales scheduling stage.

In the same way as in the case in which the operating main machine figures are forecasted, the forecast accuracy of forecast method 1 is higher than that of forecast method 2. However, in certain cases, even if there are sufficient data, there are cases in which the accuracy of forecast method 2 is higher than that of forecast method 1. In such cases, the manual forecast mode is selected.

(Step k3a1) Supply Sales Record Smoothing Step (S1106)

The supply sales record z(t) is smoothed. The CPU 101 realizes smoothing by applying a moving average (for example, a moving average of 12 months) to the supply sales record z(t) stored in the RAM 106. The smoothed supply sales record z(t) serves as a new supply sales record z(t). Because the smoothing is for absorbing variations due to errors or seasonal variations, provided that it is a method enabling smoothing, the smoothing is not limited to applying a moving average.

(Step k3a2) Endurance Print Volume and Diffusion Coefficient Calculating Step (S1107)

An endurance print volume per unit-time C and a diffusion density function p(t) are determined from the smoothed supply sales record z(t) and the total PV forecast $\hat{V}(t)$ The endurance print volume is PV taken per one unit of unit-time, and the diffusion density function p(t) is the probability density that a supply sold during a time period H (diffusion range, delay width) before a certain time will be consumed during the time period H.

In the forecast model of the supply in this case, the endurance print volume C of the same supply model of the same sales area is constant at all times, and follows the same diffusion density function. This assumption is one of the features of the present invention.

Accordingly, the forecast model of the supply can be expressed by the following formula.

$$\hat{V}(t) = C \int_{t-H}^{t} p(t-\tau) z(\tau) \, d\tau + e(t) \quad \text{(Formula 23)}$$

Here, p(t) is the probability density function. p(t) is defined in the section $0 \leq t \leq H$, and satisfies $$\int_0^H p(t)\,dt = 1 \quad \text{(Formula 24)}$$

and
$p(t) \geq 0$ (Formula 25). Further, e(t) is the error at time t. The sum of squares Se of the error showing the sum of squares of the error e(t) can be expressed as follows.

$$Se = \int_0^T e(t)^2\,dt = \int_0^T \left(\hat{V}(t) - C\int_{t-H}^t p(t-\tau)z(\tau)\,d\tau\right)^2 dt \quad \text{(Formula 26)}$$

The endurance print volume C and the diffusion density function p(t) making the sum of squares Se of the error be a minimum under the conditions of formula 24 and formula 25 are determined by numerical analysis by the CPU 101. Note that, at this time, it is supposed that the diffusion range (delay width) H has been inputted in advance.

(Step k3b1) Endurance Print Volume and Diffusion Coefficient Setting Step (S1109)

Because it is difficult to determine a stable endurance print volume C and probability density function p(t) when the number of data of the supply sales record z(t) is few, the endurance print volume C, the diffusion density function p(t), and the diffusion range (delay width) H are inputted in advance.

(Step k4) Supply Sales Forecast Step (S1110)

The sales forecast of the supply (demand forecast) determines $\hat{Z}(t)$.

The endurance print volume C, the diffusion density function p(t), and the diffusion range H determined in step k3a1, or the endurance print volume C, the diffusion density function p(t), and the diffusion range H set by step k3b1, are substituted into formula 23, and the z(t)s are successively determined such that the Se is made to be a minimum.

The sales forecast of the supply is $\hat{Z}(t)$.

(Step k5) Seasonal Variation Compensating Step (S1111)

Compensation process by seasonal variations is carried out. What is called seasonal variation here is that the sales figures vary in accordance with the season such as, in the example of the image forming device in the present embodiment, the print volume increases at the Christmas season or at the time when accounts are settled.

First, it is judged whether seasonal variation compensation is to be carried out or not. This judgement may be realized by the CPU 101 noticing a certain condition (for example, the number of data of a certain parameter stored in the RAM 106), or may be determined by the user via the input unit 102. When it is judged that there is seasonal variation, sales forecasting of the supply in consideration of the seasonal variation is carried out. When it is judged that there is no seasonal variation, sales forecasting of the supply in consideration of the seasonal variation is not carried out.

When sales forecast of the supply in consideration of the seasonal variation is carried out, the following process is carried out.

When a seasonal variation is considered, there is the need to determine a seasonal variation coefficient u(i). The seasonal variation coefficient u(i) is calculated from record data, and may be inputted in advance. It is appropriately selected whether to use a seasonal variation coefficient u(i) calculated from the record data or a seasonal variation coefficient u(i) set in advance. The selection may be automatically carried out on the basis of a certain condition by the CPU 101, or may be inputted. The selection method has the following two modes.

(1) Automatic Calculating Mode

When the effective number T stored in the RAM 106 is equal to or greater than a threshold value N (for example, N=24) also stored in the RAM 106, the seasonal variation coefficient is calculated from the record data. A maximum natural number n satisfying $12n \leq T$ is found among the most recent time data, and the seasonal variation coefficient is determined from the data from time T−12n+1 to T. Here, for convenience, it is supposed that T−12n+1 is the starting point 0 and that T is the time of 12n−1.

The CPU 101 determines a variation ratio g(t) from the period stored in the RAM 106 by using following formula.

$$g(t) = \frac{z(t) - \hat{z}(t)}{\hat{z}(t)} \quad \text{(Formula 27)}$$

When the seasonal variation is extracted, the magnitude of the variation largely varies when the absolute quantity of that month is large, and varies slightly when the absolute quantity is small. For example, if the sales figures (basic demand figures) is 100 in January 2000 and is 1000 in January 2001, because there are a large number of cases in which the variation quantity varies to 10 and 100 in correspondence therewith, it should be taken at the variation ratio. In this example, they are 10/100 and 100/1000, and the both are 0.1. Accordingly, when a periodic variation is extracted, there are a large number of cases in which taking by the variation ratio in order to not depend on the magnitude of the absolute quantity is more suited to actuality (normalization). To this end, a trend value (basic demand figure) is removed from an observed value, and normalization is carried out by dividing it by the trend value. Further, the CPU 101 determines the seasonal variation coefficient u(i) by the following formula.

$$u(i) = \frac{1}{n}\sum_{j=0}^{n-1} g(i + 12j) \quad \text{(Formula 28)}$$

The above-described formula determines the average of the variation ratios of the respective months. The average of the variation ratios for each month from January to December is determined, such as, for example, the variation coefficient of May is an average of the variation ratios of May 1998, May 1999, and May 2000, and this serves as the seasonal variation coefficient. Because the variation ratio is determined so as to not depend on the absolute quantity in (formula 27), taking the average is important, and the accuracy is improved even more by taking the average. However, $$0 \leq i \leq 11 \quad \text{(Formula 29).}$$

The sales forecast after compensating the seasonal variation $\hat{Z}(t)$ is determined by the following formula.

$$\hat{Z}(t) = \hat{z}(t)(1 + u(\mathrm{mod}(t,12))) \quad \text{Formula 30}$$

The above formula is a formula determining the sales forecast in which the sales forecast (trend value, basic demand figure) is multiplied by the seasonal variation coefficient of each month and the seasonal variation is added thereto. This computation is realized by the CPU 101.

For example, the sales forecast of May 2000 is to determine a value in which the seasonal variation coefficient of May is multiplied by the sales forecast of May 2000, and the seasonal variation is added.

Note that mod(t,12) expresses the remainder when t is divided by 12. The determined $\hat{z}(t)$ newly serves as $\hat{z}(t)$.

On the other hand, when the effective number T is less than a certain threshold value N, u(i) is a seasonal variation coefficient of i+1 month given in advance. The value after compensating the seasonal variation is determined by formula 30 by using u(i) given in advance, and the determined $\hat{Z}(t)$ newly serves as $\hat{Z}(t)$.

(2) Manual Mode

In the automatic calculating mode, it is automatically judged whether the seasonal variation coefficient is to be calculated or a value given in advance is to be used. However, there are cases in which automatic judgement is inconvenient. In such cases, whether the seasonal variation coefficient is to be calculated or a value given in advance is to be used is determined in advance by the manual mode.

In this way, by making it possible to select whether the automatic calculating mode or the manual mode is to be used, more flexible and mobile forecast is possible.

(Step k6) Various Coefficients Calculating Step

Next, the CPU 101 determines the disappearance date Ed, the aging coefficient Ag, the multiple correlation coefficient R, and the standard error s of the supply on the basis of various types of parameters stored in the RAM 106.

The disappearance date Ed is a time (date) when $\hat{Z}(t)$ becomes 0. This expresses the time at which the demand for the supply on the market will probably disappear.

Instead of that $\hat{Z}(t)$ becoming 0, a time at which it is less than a certain threshold value may serve as the time Ed at which the demand disappears.

The aging coefficient can be calculated by the $$Ag = \frac{\int_0^C \hat{z}(t)\,dt}{\int_0^\infty \hat{z}(t)\,dt}. \qquad \text{(Formula 31)}$$

C is an address corresponding to the time when the forecast process is executed. This is an index showing how much demand is there at the present point in time with respect to all of the demand for the supply in the market. When the aging coefficient Ag is 0, it shows that demand does not arise at the present point in time, and when the aging coefficient Ag is 1, it shows that demand has already ended at the present point in time.

The multiple correlation coefficient R is determined by the following formula.

$$R = \frac{\int_0^T (\hat{z}(t) - \bar{z})(z(t) - \bar{z})\,dt}{\sqrt{\int_0^T (\hat{z}(t) - \bar{z})^2\,dt \int_0^T (z(t) - \bar{z})^2\,dt}} \qquad \text{(Formula 32)}$$

Note that $$\bar{z} = \frac{1}{T}\int_0^T z(t)\,dt. \qquad \text{(Formula 33)}$$

The multiple correlation coefficient R is an index expressing the forecast accuracy. The closer R is to 1, the better the accuracy, and the closer R is to 0, the worse the accuracy.

The standard error s is determined by the following formula.

$$s = \sqrt{\frac{1}{T}Se}. \qquad \text{(Formula 34)}$$

The standard error s is an index expressing the forecast accuracy, and the closer S is to 0, the better the accuracy.

In the present embodiment, the unit-time is a month. However, the unit-time may be units of years, units of days, or units of weeks. Further, the process does not proceed at each unit-time, and may be carried out at each arbitrary time. Namely, the process may proceed at an inconstant interval such as for one month→for two months→for one month→for three months.

As described above, in accordance with the present invention, schedule planning support of a supply business or the like can be carried out on the basis of the demand forecast result for the supply.

5. Display of Forecast Result

The forecast result of the operating main machine figures and the demand forecast result of the supply described above are displayed in a table format and/or a graph format on the output unit 103 by control by the CPU 101.

FIG. 36 shows a screen when the demand forecast result of a supply is displayed on the output unit 103.

In the same way, it goes without saying that various types of coefficients (for example, the reliability coefficient h, the disappearance date Ed, the aging coefficient Ag, or the like) may also be displayed on the output unit 103.

6. Switching of Forecast Method

In the conventional forecast method and the above-described forecast method, because a single forecast method is used throughout the entire sales term of the product, when the sales demand varies due to a cause which the forecast method does not suppose, there are cases in which accuracy of the sales forecast deteriorates.

In particular, with regard to the following three points, it has been difficult for the conventional forecast method to realize a precise forecast.

A. Pipeline Fill

In the industry of supplies or the like of business machines or peripheral equipment of personal computers, because there is the obligation to exactly supply to the end users, there are a large number of cases in which a commission merchant or a sales store has a stock of the supply. The demand for keeping the stock full is generally called pipeline fill. Because of the pipeline fill, at the initial term of sales, a characteristic demand which cannot be forecasted by the conventional forecast method arises.

B. Appearance of Compatible Products

In the industry of supplies or the like of business machines or peripheral equipment of personal computers, there are cases in which compatible products which have compatibility and are manufactured by other manufacturers appear in addition to the supply manufactured by the manufacturer of the main machine such as business equipment or the like. In this case, there are cases in which the sales of the supply manufactured by the manufacturer of the main machine are affected. The conventional forecast method has not been able to forecast sufficiently with respect to such appearance of compatible products.

C. Supply Sales Term Final Stage

The supplies of business machines or peripheral equipment of personal computers must be sold during the term in which users continue to use the main machine after sale of the main machine has ended. Therefore, in the final stage of the supply sales term, there are cases in which the sales of the supply become unstable due to used products of the business machines or peripheral equipment of personal computers being distributed in markets other than the market supposed by the manufacturer, or the like. The conventional forecast method has not been able to precisely forecast such a final stage of the sales term.

The present invention is created in order to solve the problems as described above. This will be described in detail on the basis of the figures hereinafter.

Figure 18:
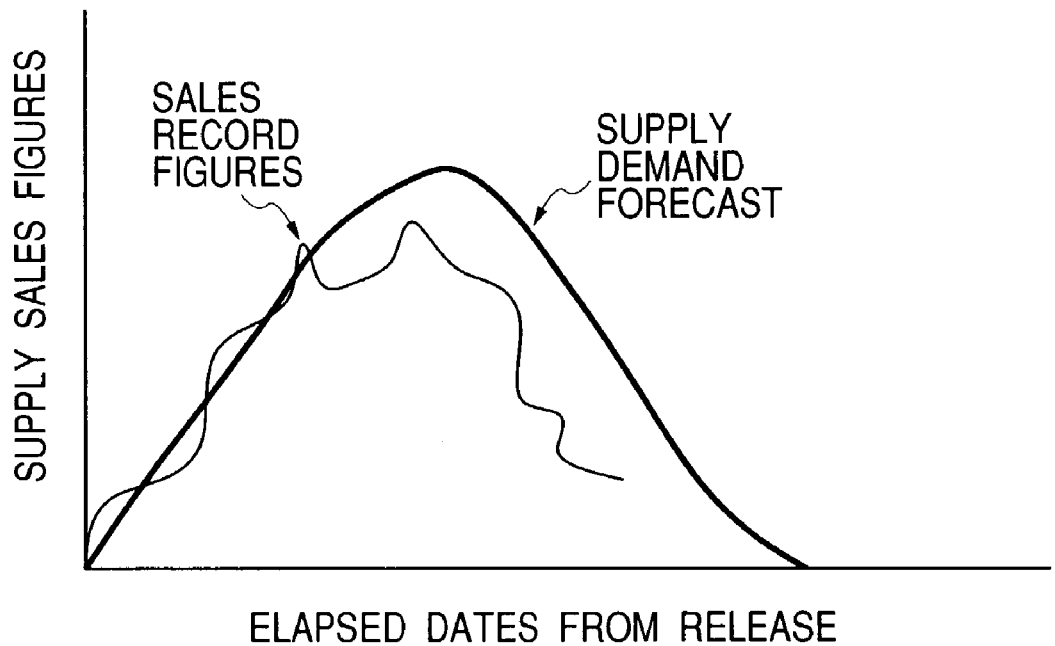
FIG. 18 is a conceptual diagram of a supply demand forecast.

FIG. 18 is a conceptual view of demand forecast for a supply.

In the figure, the demand forecast for a supply at a certain point in time which is a transition of the sales record is shown. Hereinafter, a "supply" will be described. However, the "supply" may be a "product".

Figure 19:
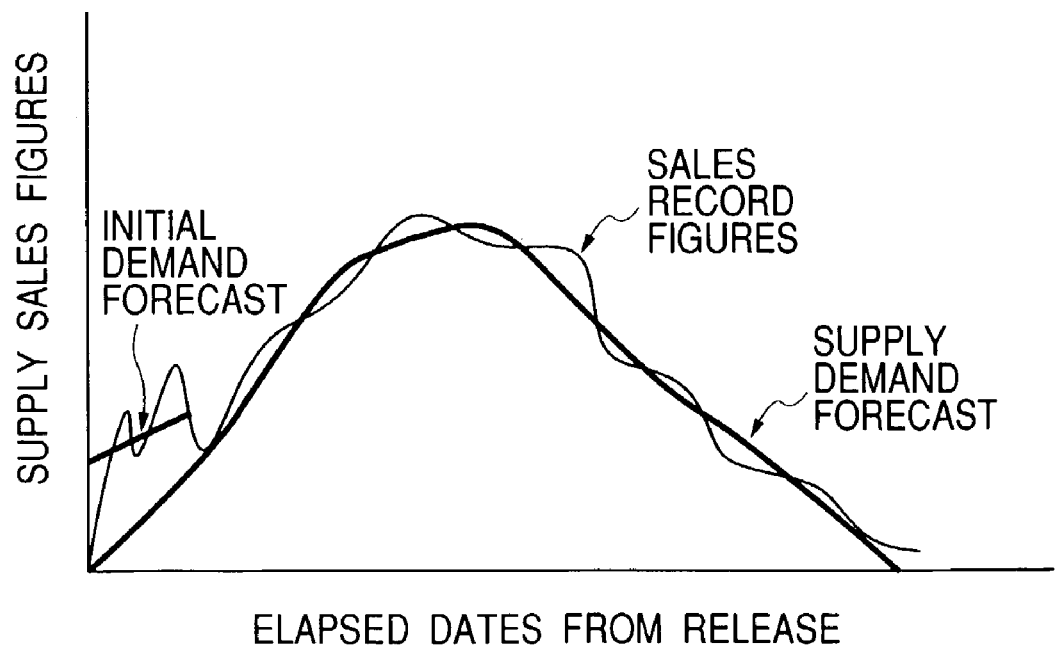
FIG. 19 is a conceptual diagram of an initial demand forecast.

FIG. 19 is a conceptual diagram of an initial demand forecast for solving the problem of the pipeline fill (A).

As can be understood by looking at the sales record in FIG. 19, the sales figures, in an initial term of the sales, show movement different from that of the other terms.

Figure 20:
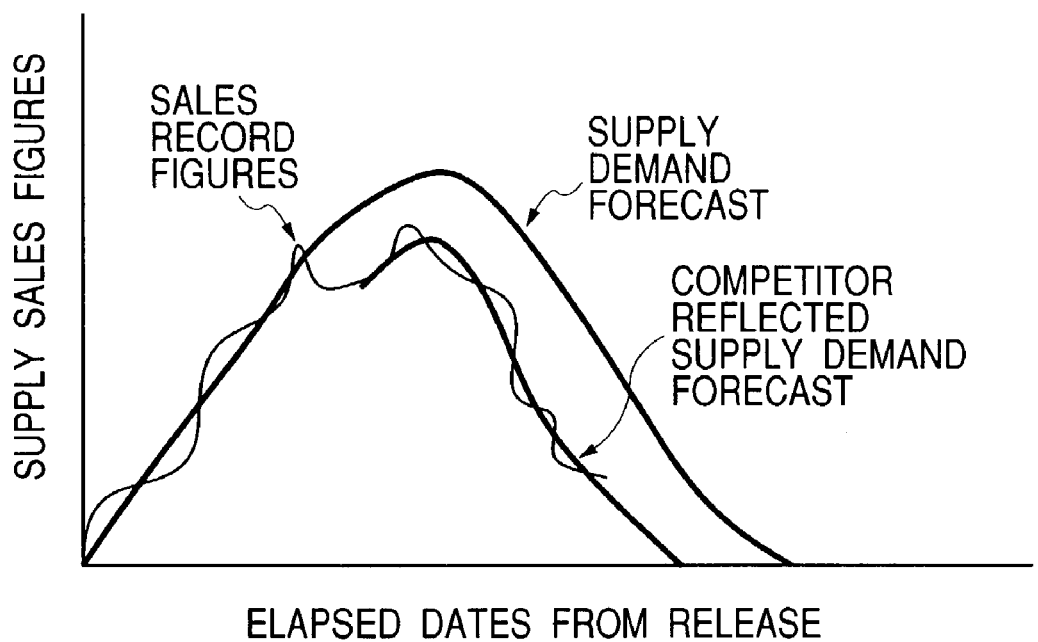
FIG. 20 is a conceptual diagram of a competitor reflected demand forecast.

FIG. 20 is a conceptual diagram of competitor reflected demand forecast for solving the problem of the appearances of compatible products (B).

As can be understood by looking at the sales record in FIG. 20, the sales figures stray away from the initial demand forecast from a certain point in time (appearance of compatible product).

Figure 21:
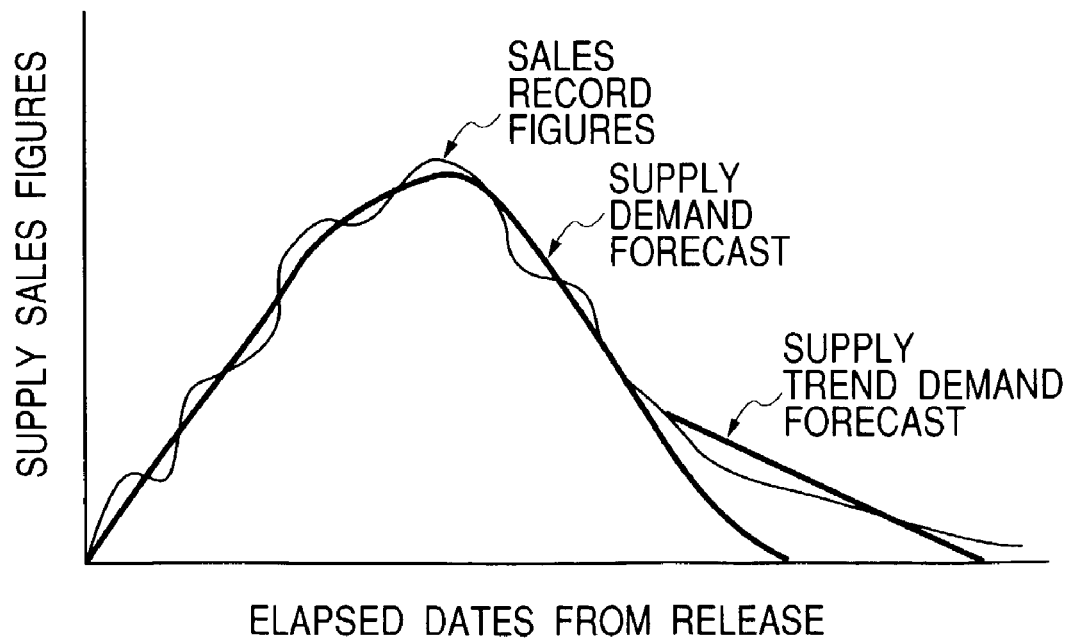
FIG. 21 is a conceptual diagram of a demand forecast at the final stage of the sales term (trend forecast).

FIG. 21 is a conceptual diagram of a trend demand forecast for solving the problem of the final stage of the sales term.

As can be understood by looking at the sales record in FIG. 21, in the final stage of the sales term, movement dissociated from the initial demand forecast is shown.

Figure 23:
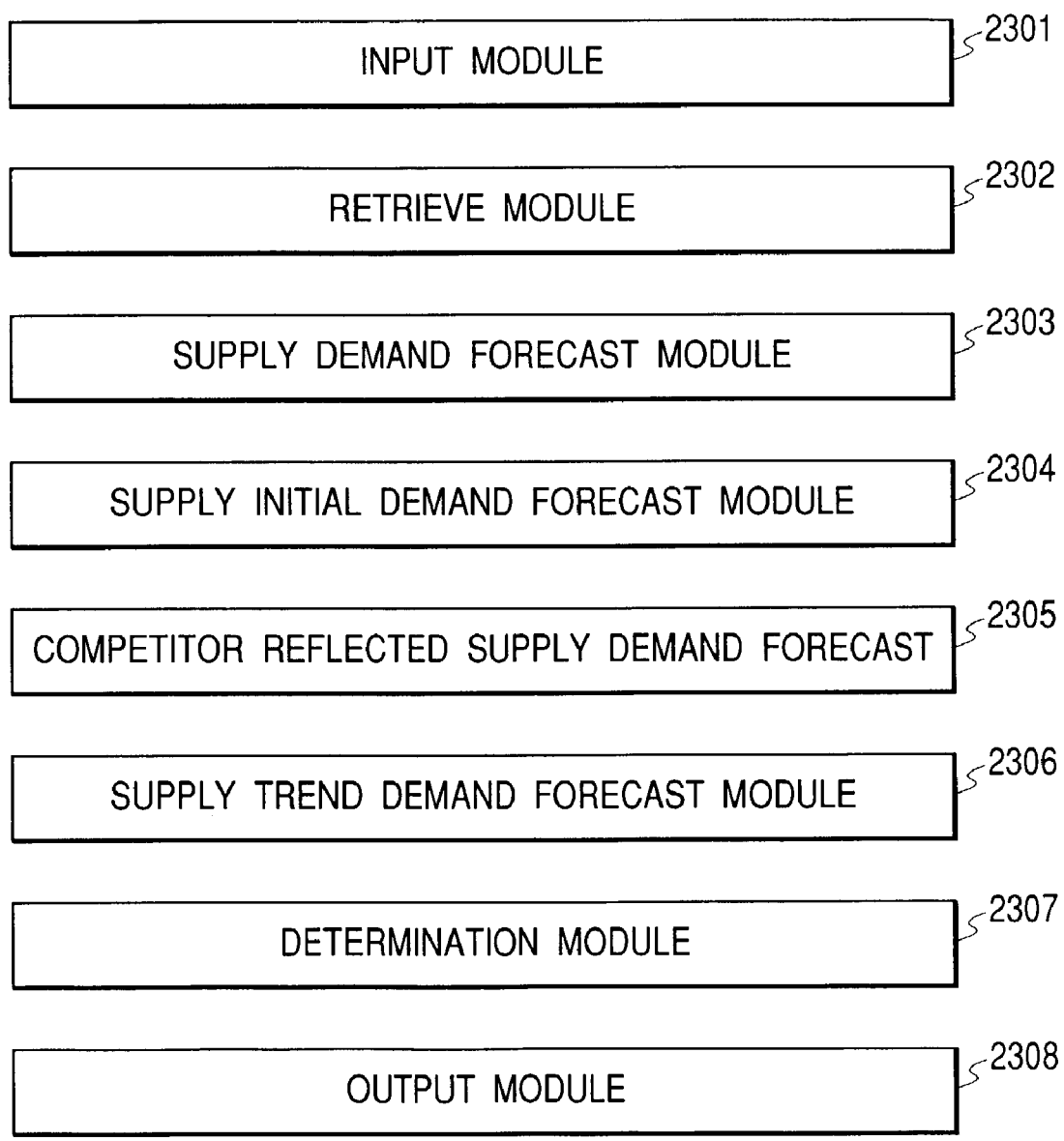
FIG. 23 is a diagram showing a module structure to be added to the module structure of the program of FIG. 17.

FIG. 23 shows a module structure which is for switching forecast methods and which is added to the module structure of the program of FIG. 17.

(Supply Demand Forecast Module (2303))

This is a module executing the above-described demand forecast method of the main machine or the supply, or demand forecast utilizing simple linear (nonlinear) approximation. The supply demand forecast module (503) assumes that the latest forecast results are always accumulated therein.

(Supply Initial Demand Forecast Module (2304))

This is a module realizing supply initial demand forecast (F2) for solving the problem of the pipeline fill of FIG. 19.

The supply initial demand forecast module is realized on the basis of the following two models.

(Model 1) Main Machine Accompanying Model

For a constant term from the main machine sales start month (designated by a supply initial demand forecast model master), a coefficient designated by the supply initial demand forecast model master is applied to the main machine sales record/schedule (RPM), and the forecast result is adopted.

(Model 2) Demand Forecast Proportional Model

For a constant term from the first month of the supply demand forecast (designated by a supply initial demand forecast model master), a coefficient designated by the supply demand forecast model master is applied to the supply demand forecast result (FC1), and the forecast result is adopted.

(Competitor Reflected Supply Demand Forecast Module (2305))

This is a module realizing the competitor reflected supply demand forecast (F4) for solving the problem of the appearance of a compatible product (B) of FIG. 20.

Here, the competitor reflected supply demand forecast is a forecast in which a competitor reflected supply coefficient is applied to the supply demand forecast result (FC1) and the calculated result serves as the forecast result. The object term is determined as follows.

The months after a term (months) of the competitor reflected forecast model master have passed from the first month in which there is the supply sales record (RC), are the competitor reflected supply forecast object term (T(FC5)).

FIG. 36 is a diagram showing an example of the supply sales record (RC) and the competitor reflected supply forecast object term (T(FC5))

In the example of FIG. 36, because there is the sales record from March, 1999, the term from February 2001 which is the 24$^{th}$ month can be the object term.

Further, a competitor reflected supply coefficient is arbitrarily set in advance for the competitor reflected model master.

(Supply Trend Demand Forecast Module (2306))

This is a module realizing the supply trend demand forecast (F3) for solving the problem of the final stage of the sales term of FIG. 21.

In the supply demand trend forecast, without using the causal relation with the total PV forecast used for the supply demand forecast, the demand is forecasted by carrying out nonlinear regression analysis or the like on the sales record of the supply itself on a time base.

The supply which is to be the object is an object for which the sales of the main machine thereof have substantially ended, or is an arbitrarily designated supply.

(Determination Module (2307))

It is determined which demand forecast result is suited to the latest record. Differences between the record of the latest past n months and the respective demand forecasts are calculated, and a demand forecast having the smallest difference is selected.

Figure 24:
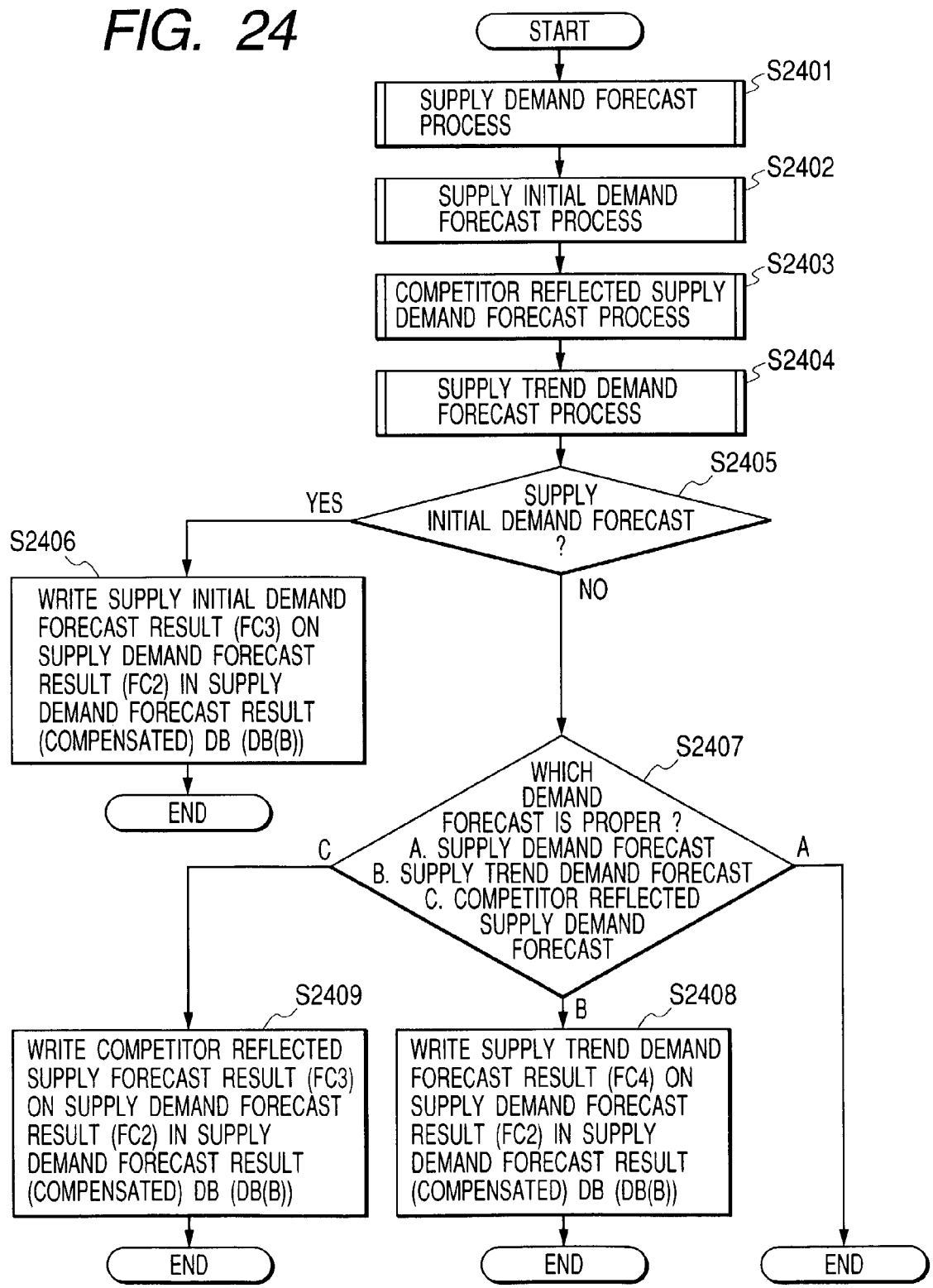
FIG. 24 is an overall flowchart.

FIG. 24 is an overall flowchart of the present invention.

The supply demand forecast process in S2401 of the figure is in accordance with the above-described 1. Operating main machine figure forecast, 2. Main machine average PV forecast, 3. Main machine total PV forecast, and 4. Supply demand forecast.

Figure 25:
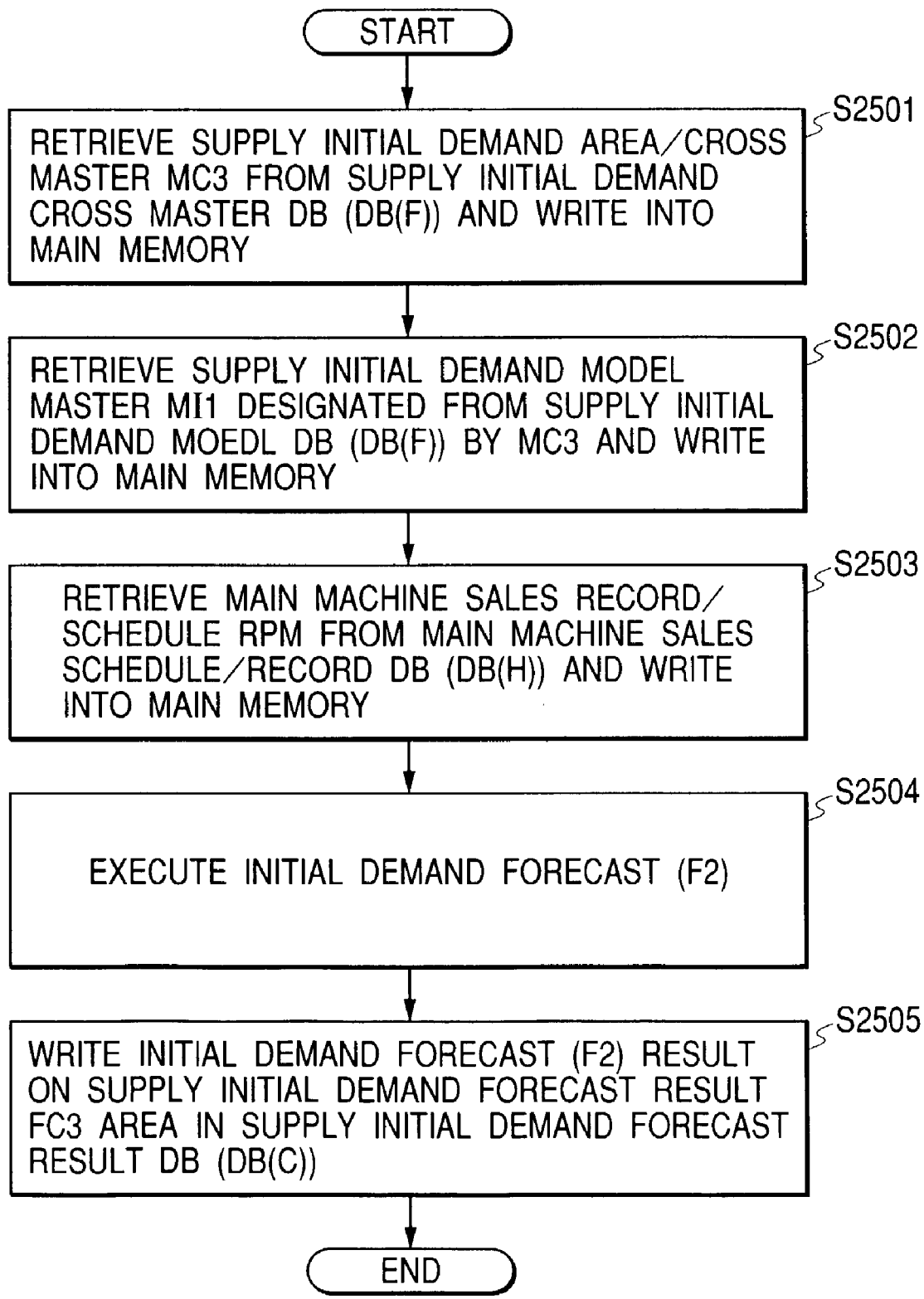
FIG. 25 is a flowchart showing details of a supply initial demand forecast process.

FIG. 25 is a flowchart showing details of the supply initial demand forecast process in S2402 of FIG. 24.

In S2501, the CPU 101 calls up a supply initial demand area/cross master MC from a supply initial demand cross master DB (DB(F)), and writes it into the RAM 106.

In S2502, the CPU 101 calls up a supply initial demand model master M11 designated by the MC from a supply initial demand model DB (DB(G)), and writes it into the RAM 106.

In S2503, the CPU 101 calls up a main machine sales record/schedule RPM from a main machine sales schedule/record DB (DB(H)), and writes it into the RAM 106.

In S2504, the CPU 101 executes the initial demand forecast (F2).

In S2505, the result of the initial demand forecast (F2) is written in the region of the supply initial demand forecast result FC3 in the supply initial demand forecast result DB (DB(C)).

Figure 26:
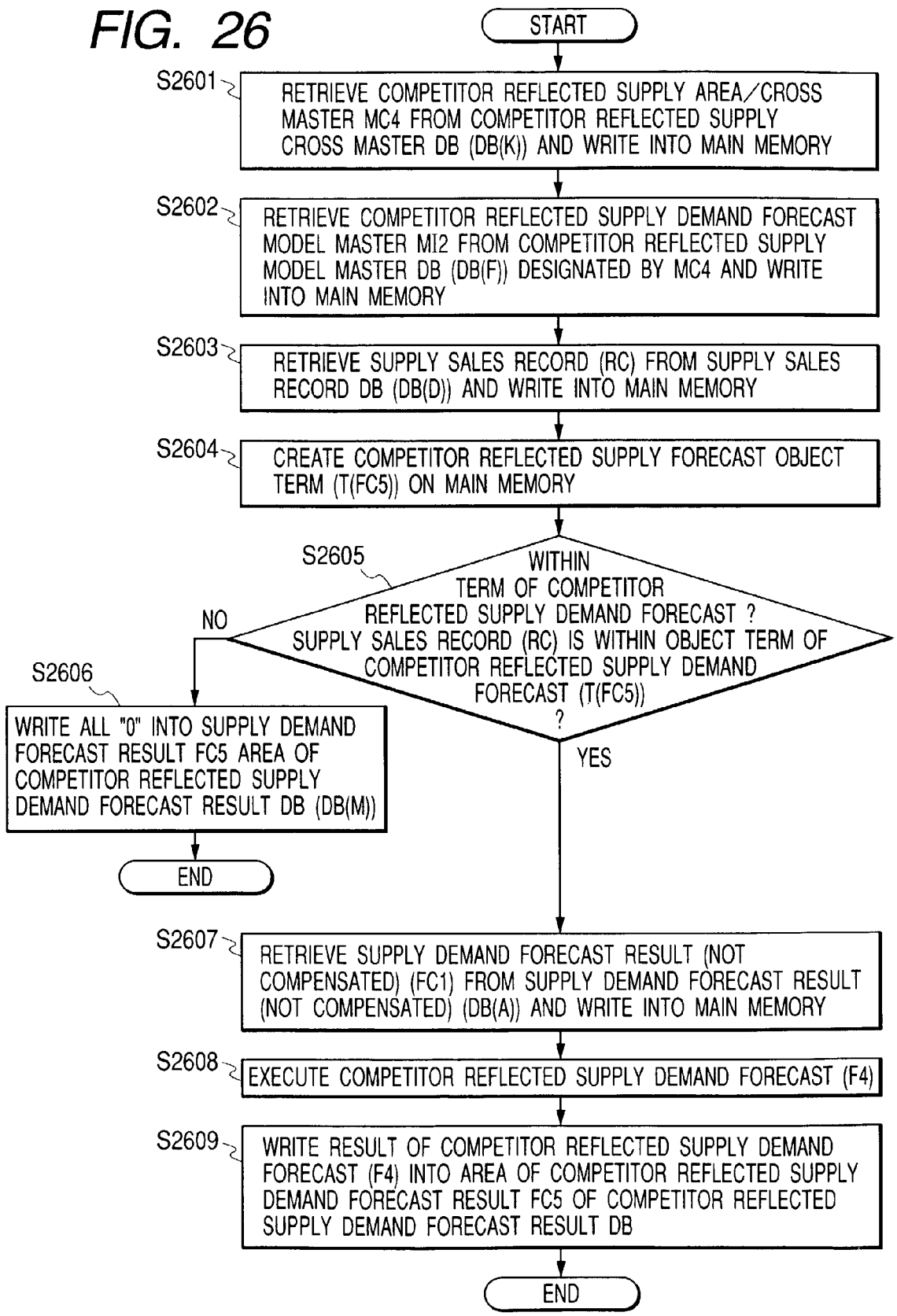
FIG. 26 is a flowchart showing details of a competitor reflected supply demand forecast process.

FIG. 26 is a flowchart showing details of the competitor reflected supply demand forecast process in S2403 of FIG. 24.

In S2601, the CPU 101 calls up a competitor reflected supply area/cross master MC4 from a competitor reflected supply cross master DB (DB(K)), and writes it into the RAM 106.

In S2602, the CPU 101 calls up a competitor reflected supply demand forecast model master M12 designated by MC4 from a competitor reflected supply model master DB (DB(L)), and writes it into the RAM 106.

In S2603, the CPU 101 calls up a supply sales record (RC) from a supply sales record DB (DB(D)), and writes it into the RAM 106.

In S2604, the CPU 101 creates a competitor reflected supply forecast object term (T(FC5)) on the RAM 106.

In S2605, the CPU 101 determines whether it is within the object term of the competitor reflected supply demand forecast. Concretely, when there is no supply sales record (RC) within the competitor reflected supply demand forecast object term (T(FC5)), the routine proceeds to S2606, and the CPU 101 writes "0" into all of the regions of the competitor reflected supply demand forecast result FC5 of the competitor reflected supply demand forecast result DB (DB(M)).

Further, in S2605, when the CPU 101 determines that there is a supply sales record within the competitor reflected supply demand forecast term, the routine proceeds to S2607, and the CPU 101 calls up the supply demand forecast result (not compensated) (FC1) from the supply demand forecast result (not compensated) (DB(A)), and writes it into the RAM 106.

In S2608, the CPU 101 executes competitor reflected supply demand forecast (F4).

In S2609, the CPU 101 writes the result of the competitor reflected supply demand forecast (F4) into the region of competitor reflected supply demand forecast result FC5 of the competitor reflected supply demand forecast result DB (DB(M)).

Figure 27:
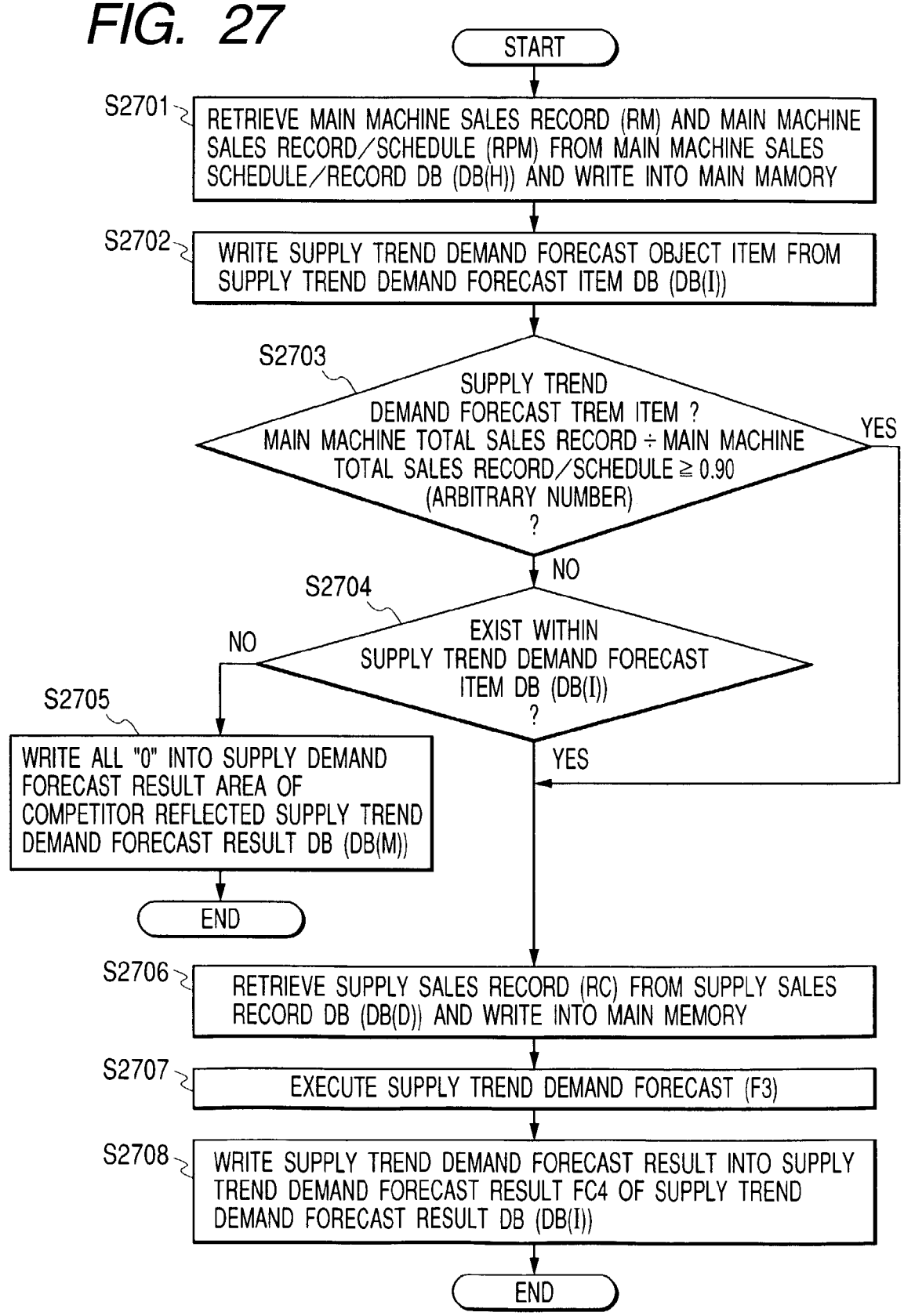
FIG. 27 is a flowchart showing details of a supply trend demand forecast process.

FIG. 27 is a flowchart showing details of the supply trend demand forecast process in S2404 of FIG. 24.

In S2701, the CPU 101 calls up the main machine sales record (RM) and the main machine sales record/schedule from the main machine sales schedule/record DB (DB(H)), and writes them into the RAM 106.

In S2702, the CPU 101 writes a supply trend forecast object item from a supply trend demand forecast item DB (DB(I)) into the RAM 106.

In S2703, the CPU 101 determines whether it is within supply trend forecast term or not. Concretely, a case in which a value in which the sum of the main machine sales record is divided by the sum of the main machine sales record/schedule is equal to or greater than an arbitrary numeric value (0.90 in FIG. 27) is considered to be within the supply trend demand forecast term.

Further, in S2703, even if it is not within the supply trend demand forecast term, there is the request that the user wishes to manually execute the supply trend demand forecast. Thus, in S2704, it is determined whether the supply trend demand forecast item DB (DB(I)) exists or not, and when it exists, the routine is manually made to proceed to S2709.

On the other hand, in S2704, when the supply trend demand forecast item DB (DB(I)) does not exist, the routine proceeds to S2705, and "0"s are written into all of the regions of the competitor reflected supply demand forecast result FC5 of the supply trend demand forecast result DB (DB(M)).

In S2706, the CPU 101 calls up the supply sales record (RC) from the supply sales record DB (DB(D)), and writes it into the RAM 106.

In S2707, the CPU 101 executes the supply trend demand forecast (F3)

In S2708, the CPU 101 writes the result of the supply trend demand forecast into the region of the supply trend demand forecast result FC4 of the supply trend demand forecast result DB (DB(I)).

Figure 28:
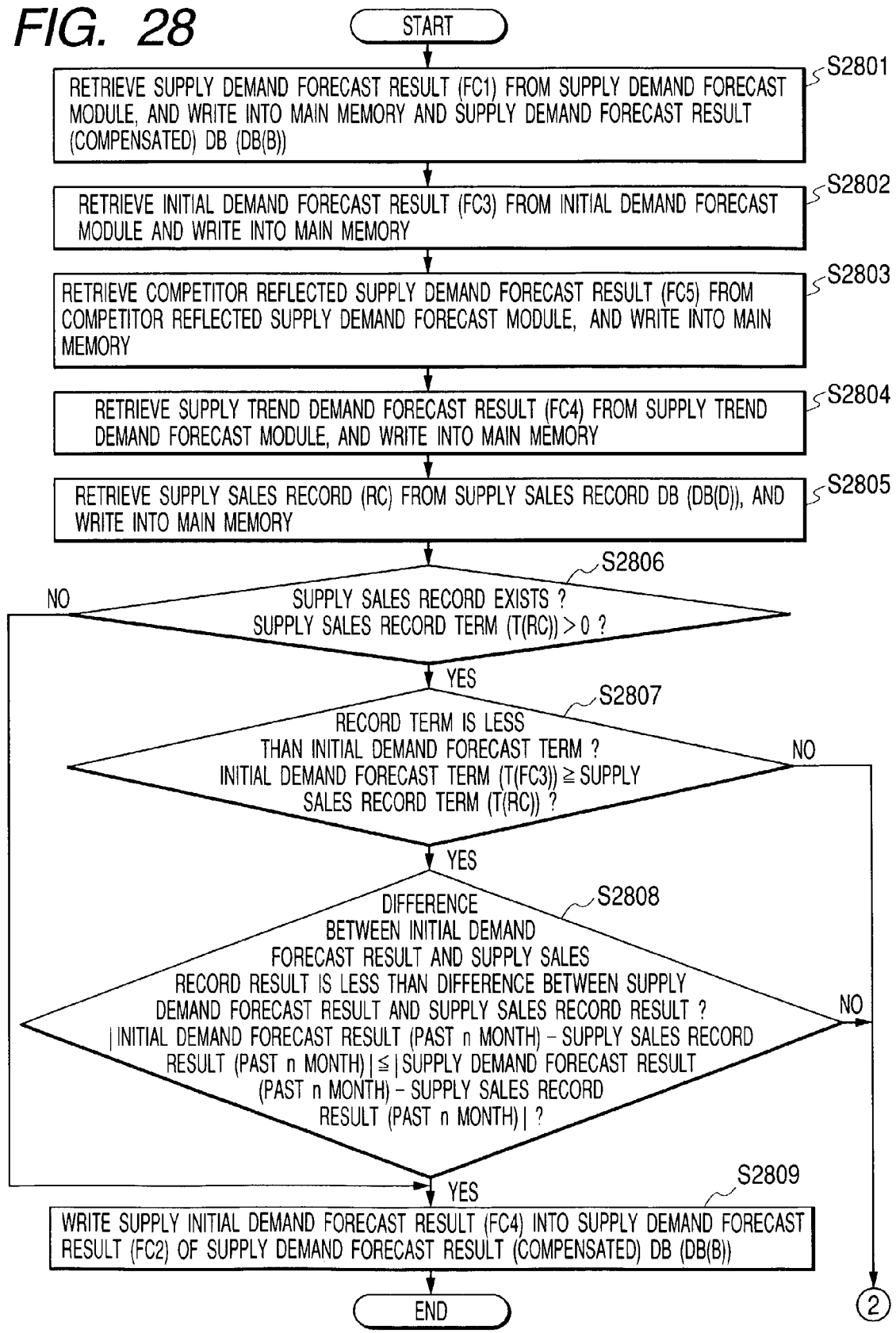
FIG. 28 is a flowchart showing a flow of determination of the forecast method.
Figure 29:
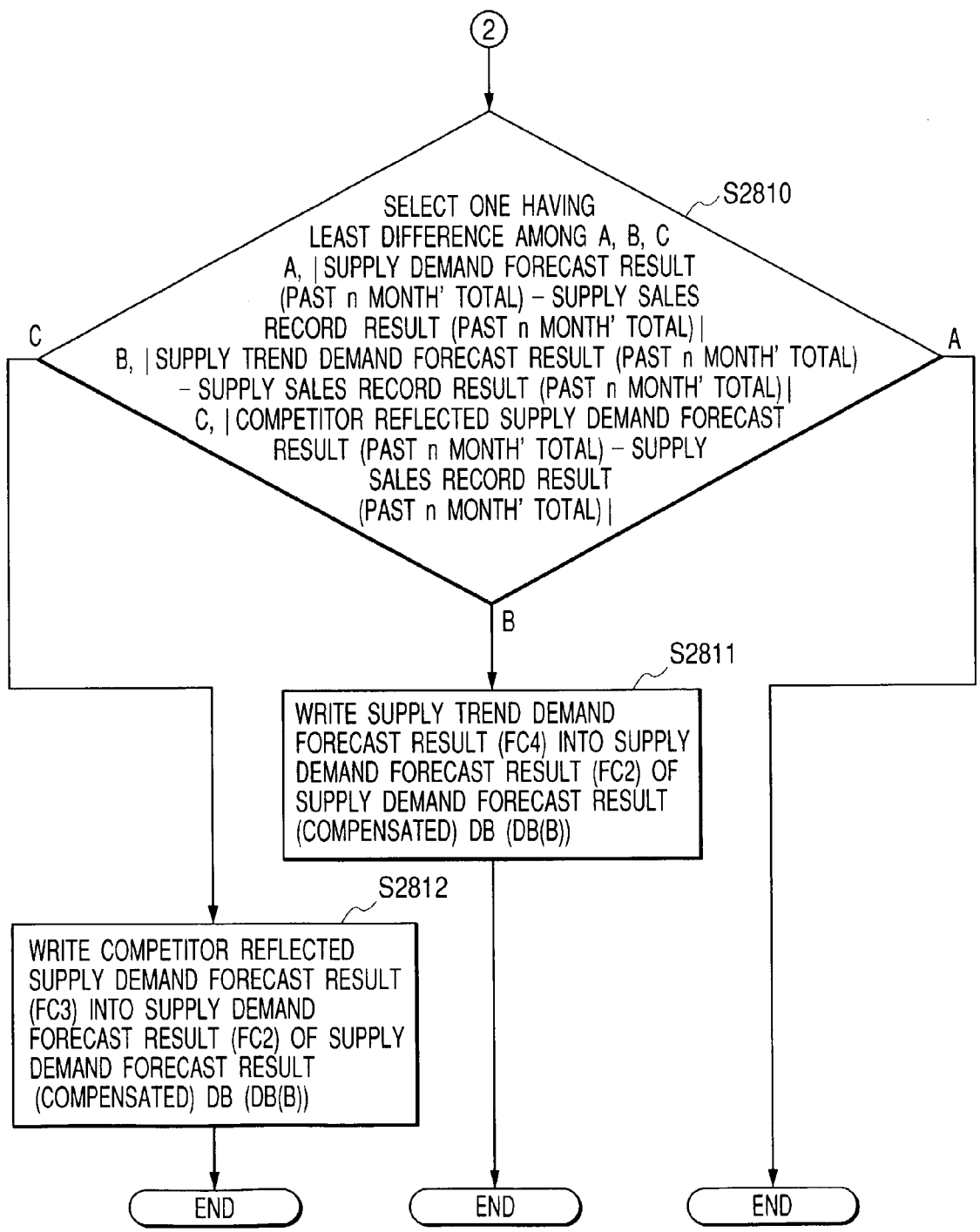
FIG. 29 is a flowchart showing a flow of determination of the forecast method.
Figure 32B:
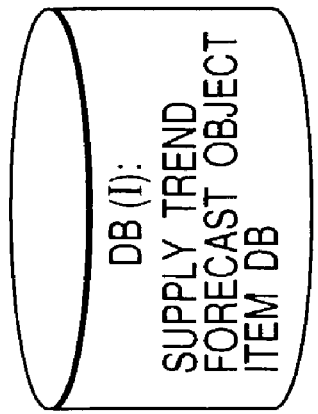
Figure 32C:
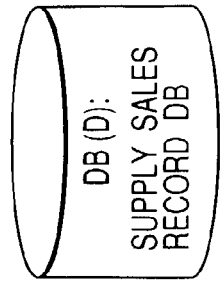
Figure 32D:
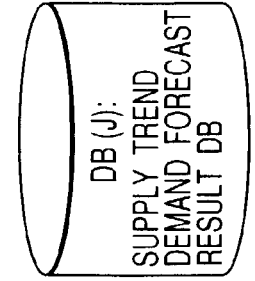

FIG. 28 and FIG. 29 are flowcharts showing flows of discrimination of forecast methods in S2405 and S2407 of FIG. 24.

In S2801, the CPU 101 calls up the supply demand forecast result (FC1) from the supply demand forecast module, and writes it into the RAM 106 and the supply demand forecast result (compensated) DB (DB(B)).

In S2802, the CPU 101 calls up the supply demand forecast result (FC3) from the initial supply demand forecast module, and writes it into the RAM 106.

In S2803, the CPU 101 retrieves the competitor reflected supply demand forecast result (FC5) from the competitor reflected supply demand forecast module, and writes it into the RAM 106.

In S2804, the CPU 101 calls up the supply trend forecast result (FC4) from the supply trend forecast module, and writes it into the RAM 106.

In S2805, the CPU 101 calls up the supply sales record (RC) from the supply sales record DB (DB(D)), and writes it into the RAM 106.

In S2806, the CPU 101 determines whether there is a supply sales record or not. Concretely, if the supply sales record term (T(RC)) is greater than 0, the routine proceeds to S2807, and if it is not, the routine proceeds to S2809.

In S2807, the CPU 101 determines whether or not the supply sales record term is less than or equal to the initial demand forecast term. Concretely, if the initial demand forecast term (T(FC3)) is equal to or greater than the supply sales record term (T(RC)), the routine proceeds to S2808, and if it is not, the routine proceeds to S2910 of FIG. 29 which will be described later.

In S2808, the CPU 101 determines whether the difference between the initial demand forecast result and the supply sales record is smaller as compared with that of the supply demand forecast result. Concretely, it is determined whether or not the absolute value of the difference between the supply demand forecast result and the supply sales record result of the past n months (n is arbitrary) is smaller than the absolute value of the difference between the supply demand forecast result and the supply sales record result. When the CPU 101 determines that the absolute value of the difference between the supply demand forecast result and the supply sales record result of the past n months is smaller than the absolute value of the difference between the supply demand forecast result and the supply sales record result, the routine proceeds to S2809, and if it is not so, the CPU 101 operates to move to S2910 of FIG. 29 which will be described later.

In S2809, the CPU 101 writes the supply initial demand forecast result (FC4) into the supply demand forecast result (FC2) of the supply demand forecast result (compensated) DB (DB(B)).

In S2910 of FIG. 29, the smallest absolute value of the difference among following A, B, C is determined.

A. The absolute value of a difference between the supply demand forecast result and the supply sales record result of the past n months.

B. The absolute value of a difference between the supply trend demand forecast result and the supply sales record result of the past n months.

C. The absolute value of a difference between the competitor reflected supply demand forecast result and the supply sales record result of the past n months.

If B. is the smallest value, the routine proceeds to S2911, and the supply trend demand forecast result (FC4) is written into the supply demand forecast result (FC2) of the supply demand forecast result (compensated) DB (DB(B)). If C. is the smallest value, the routine proceeds to S2912, and the competitor reflected supply demand forecast result (FC3) is written into the supply demand forecast result (FC2) of the supply demand forecast result (compensated) DB (DB(B)).

FIGS. 34A to 34H through FIGS. 35A to 35E are diagrams showing various types of databases of the present invention.

FIGS. 30A to 30D are diagrams showing the transition of the databases at the time of the initial supply demand forecast.

FIGS. 31A to 31F are diagrams showing the transition of the databases at the time of the competitor reflected supply demand forecast.

FIGS. 32A to 32D are diagrams showing the transition of the databases at the time of the supply trend demand forecast.

FIGS. 33A to 33E are diagrams showing the transition of the databases at the time of determining the forecast method.

Note that it goes without saying that all of the above-described processes are realized by the CPU 101 shown in FIG. 1 or the like.

As can be understood by referring to the flows or the transitions of the databases from FIG. 24 to FIGS. 35A to 35E, in the present invention, by focusing on the sales properties of A. Pipeline fill, B. Compatible product appearance, and C. Sales term final stage, measures are taken to make forecast errors, which will be probably arise due to these properties, be minimum.

FIG. 22 is a table in which these processes are arranged compiled.

The present invention has the following effects.

Supply demand forecast switching system

Highly-accurate production, sales, and stock schedules can be executed for each sales term by providing and selecting a demand forecast method which is appropriate for each sales term. As a result, it is possible to not miss sales opportunities and to maintain the appropriate stock.

Initial supply demand forecast system

By forecasting demand for satisfying the demand for-stock of a commission merchant or a sales store generated at the initial term of the supply sales term, it is possible to not miss sales opportunities and to maintain the appropriate stock.

Competitor reflected supply demand forecast system

In the industry of supplies or the like of business machines or peripheral equipment of personal computers, with the respect to the supplies, there are cases in which, in addition to a compatible product manufactured by the manufacturer of the business main machine, a compatible product, which has compatibility therewith and which is manufactured by a manufacturer other than the manufacturer of the main machine, exists. When such a compatible product appears, by reflecting the affects thereof on the demand forecast, it is possible to not miss sales opportunities and to maintain the appropriate stock.

Supply trend demand forecast

Because usage of the main machine is continued during the sales term of the supply of the business machine or peripheral equipment of personal computers and after the sales of the main machines are ended, there are cases in which the sales of the supply become unstable due to used products of the business machine or peripheral equipment of personal computers being distributed in markets other than the market supposed by the manufacturer, or the like, in the final stage of the supply sales term. In such a case, the future sales forecast is carried out from the sales record of the supply itself. As a result, it is possible to not miss sales opportunities and to maintain the appropriate stock.

7. Supply Macro Demand Forecast

In a conventional supply forecast method, because forecasting is carried out by using one market and one product as the object, when markets and merchandises which affect one another exist, the conventional forecast cannot handle such a case.

A case in which two products whose functions can be replaced by the other exist (Example: the case of a supply for copy machine C3300, a C3300 drum unit, and a C3300 single drum)

A photosensitive body drum is a main supply which must be replaced when a copy machine or a peripheral equipment of a personal computer, for which maintenance work is required, has outputted a given amount of output. Further, the copy machine or the peripheral equipment of the personal computer have replaceable parts which must be replaced in addition to the photosensitive body drum.

In the present embodiment, with respect to the C3300 drum unit, because the photosensitive body drum and other replaceable parts previously built in the unit can be simultaneously replaced, the working time of the operator can be reduced. On the other hand, with respect to the C3300 single drum, because the operator judges the degrees of consumption of the respective supplies and replaces them, the costs of parts can be reduced.

Accordingly, the total demand for the C3300 drum unit and the C3300 single drum does not change, and it is in a relationship that if the sales of one product increase, the sales of the other product decrease.

In order to forecast the demands for both, after the total demand forecast of the C3300 drum unit and the C3300 single drum for the copy machine C3300 is carried out, the total demand forecast is divided from the record of the conventional machine or the past record of the C3300 drum unit and the C3300 single drum themselves, and thus value serves as the demand forecast of each machine.

A case in which demands of two markets which affect one another are forecasted (Example: the case of copy machine C3300 and C3300 toner which are soled in Germany and Austria)

When one type of copy machine or peripheral equipment for a personal computer is sold in two different markets as well, there are cases in which the respective two markets affect one another with respect to the supply. For example, when the copy machine C3300 and the supplies thereof are sold in Germany and Austria, it can be thought that a sales stores handling the supply will purchase the supply without considering national borders, from the reasons of geographical and cultural closeness. In this case, the total demand of the both does not change, and it is in a relationship that if the sales of one product increase, the sales of the other product decrease. Therefore, in order to forecast the demand for both, after the demand forecast of the C3300 toner of the total of both markets is carried out, the total demand forecast is divided from the record of the conventional machine or the past record of the C3300 toner itself, and thus value serves as the demand forecast of each market.

FIGS. 37A to 37E are graphs showing conceptual diagrams of the supply macro demand forecast. Hereinafter, the supply macro demand forecast will be described on the basis of FIGS. 37A to 37E.

Figure 37A:
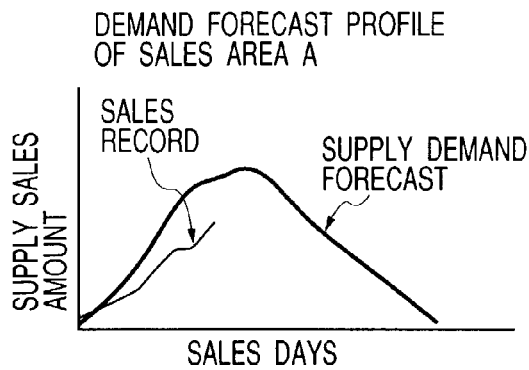
FIGS. 37A, 37B, 37C, 37D and 37E are graphs showing conceptual diagrams of supply macro demand forecasts.
Figure 37B:
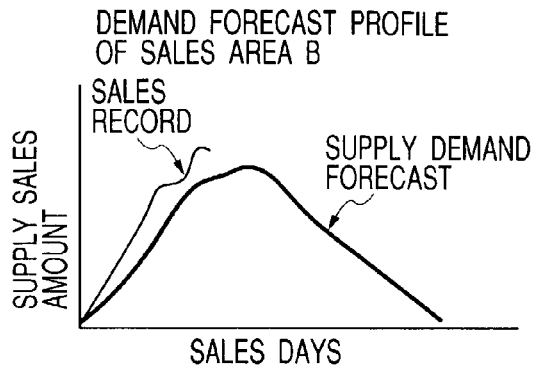

FIG. 37A is a graph of demand forecast of sales area A. FIG. 37B is a graph of demand forecast of sales area B.

In sales area A and sales area B, if it is supposed that 1000 of the copy machines have been sold in exactly the same way and the demand forecast is carried out by exactly the same parameters, as in the graphs of the supply demand forecast of FIG. 37A and FIG. 37B, both are exactly the same.

However, in a case in which markets affect one another, the total sales forecast figures correspond to the sales record. However, there are cases in which the sales record of one of the areas exceeds the sales forecast (sales area B in the case of FIGS. 37A to 37E), and the sales record of the other area is less than the sales forecast (sales area A in the case of FIGS. 37A to 37E). In other words, because the both affect one another, the demand forecast and the sales forecast are respectively dissociated.

Figure 37C:
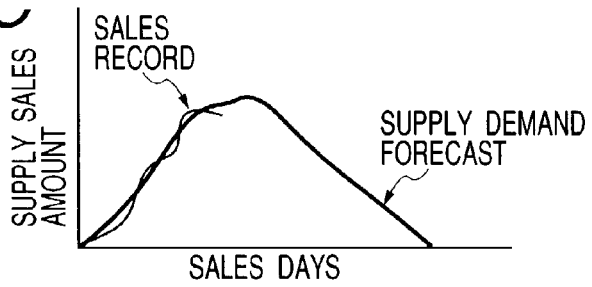

Thus, forecasting is carried out by adding the main machine sales records, the supply sales records, the forecast parameters, or the like of the above-described sales area A and sales area B. FIG. 37C is the result in which forecasting is carried out by adding the various values of the sales areas A and B.

After carrying out forecasting by adding, the supply sales forecast are reallocated (divided) on the basis of predetermined ratios of sales area A and sales area B ("predetermined ratio" will be described later).

Figure 37D:
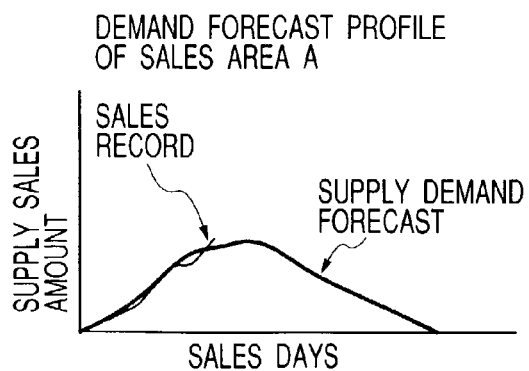
Figure 37E:
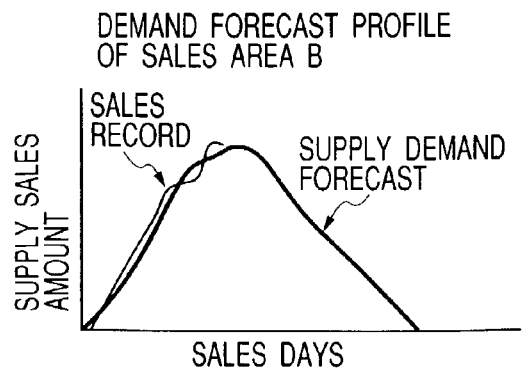

FIG. 37D and FIG. 37E show graphs of the demand forecasts of sales area A and sales area B after reallocating (dividing).

As is clear by comparing FIGS. 37A, 37B, 37D, and 37E, the forecast method, in which dividing is carried out after adding and calculating, can realize an extremely excellent forecast.

Figure 38:
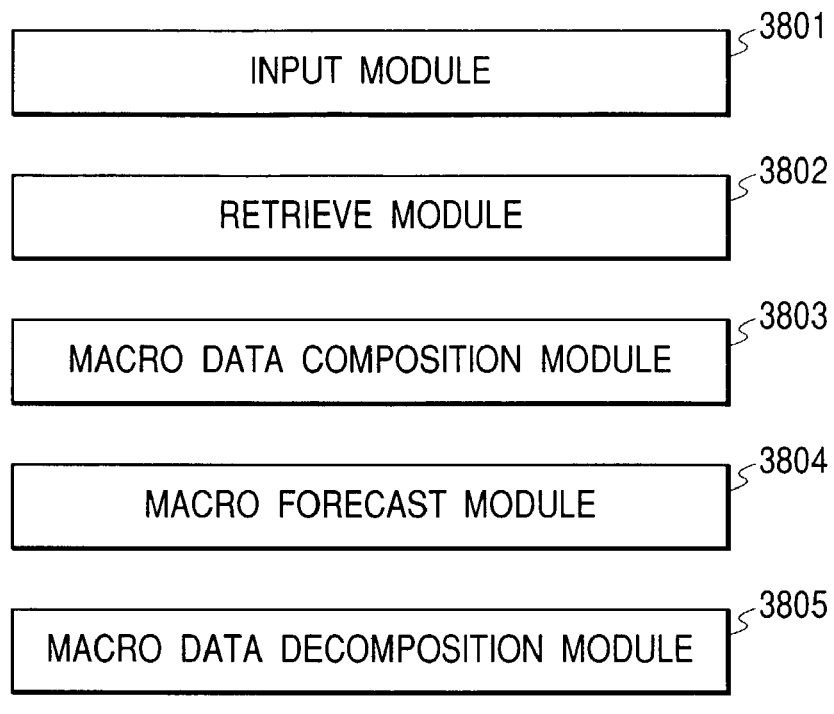
FIG. 38 shows a module structure for macro demand forecast.

FIG. 38 shows a module structure for a macro demand forecast.

Figure 39:
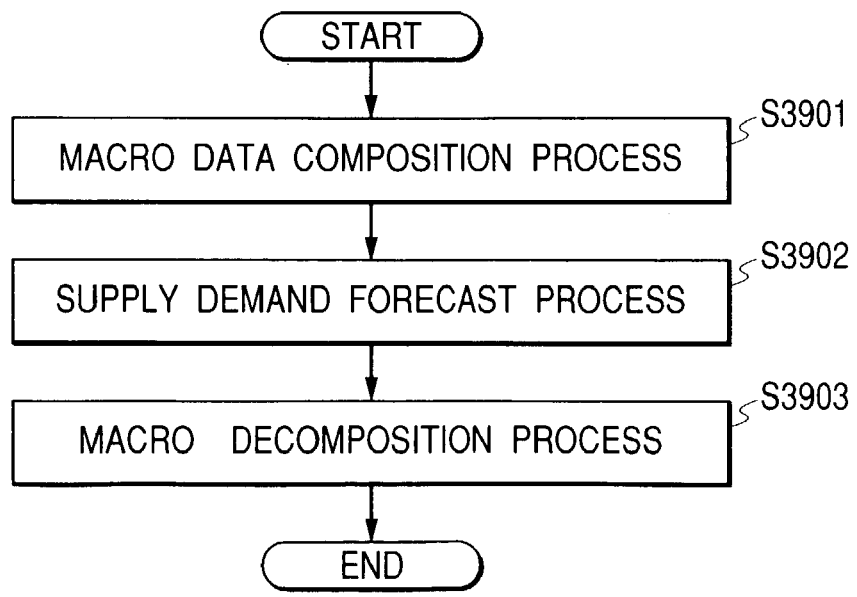
FIG. 39 is a schematic diagram of a flow of supply macro demand forecast.

FIG. 39 is a schematic diagram of a flow of the supply macro demand forecast.

FIG. 40 is a detailed figure of a flow of the supply macro demand forecast.

In S4001, the CPU 101 calls up a supply macro master (MM) from the supply macro master DB (DB(N)), and writes it into the RAM 106.

In S4002, the CPU 101 calls up a supply macro parameter (MP) from the supply macro parameter DB (DB(R)), and writes it into the RAM 106.

In S4003, the CPU 101 calls up a supply sales record (RC) from the supply sales record DB (DB(D)), and writes it into the RAM 106.

In S4004, the CPU 101 creates, on the RAM 106, the supply sales record (z) from the supply sales record (RC). By this operation, two or more supply sales records are added (for details, refer to FIG. 41D which will be described later).

In S4005, the supply demand forecast is carried out by the CPU 101.

In S4006, it is determined whether or not the supply sales record term is equal to or greater than a predetermined term (one year in FIG. 40). When the supply sales record term is equal to or greater than the predetermined term, the routine proceeds to S4007, and a macro decomposition ratio (mdr) is created from the supply sales record of the macro object item itself. The macro decomposition ratio will be described hereinafter in detail (three modes).

Figures 45, 46:
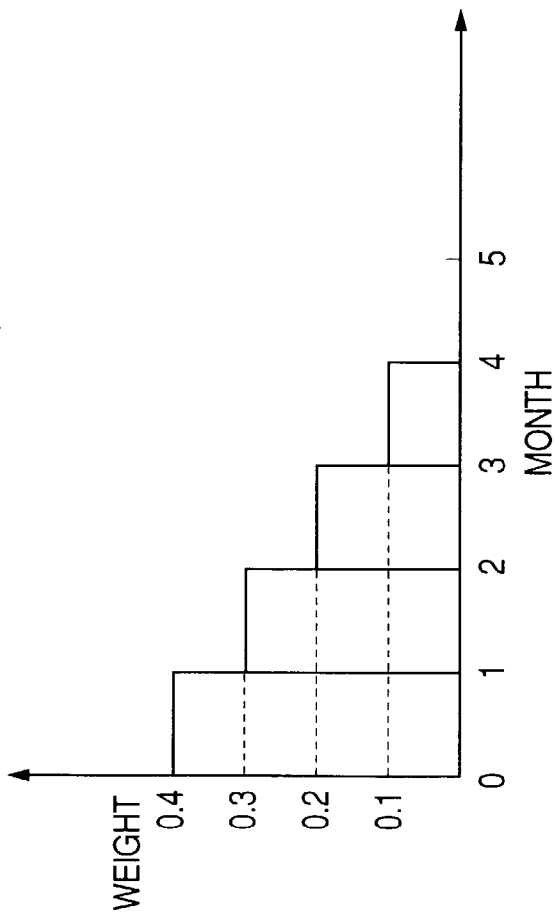
FIG. 45 is a table showing the supply sales record up to October of a given year.
FIG. 46 is a graph showing weights by which sales records are to be multiplied.

(1) Create Macro Decomposition Ratio (mdr) by Using Cumulative Value of Sales Records FIG. 45 is a table showing the supply sales record up to October of a certain year.

The cumulative value up to October of the C2000 cartridge is 370, and the cumulative value up to October of the C4000 cartridge is 145. Thus, the macro decomposition ratio (mdr) is 370:145.

(2) Create Macro Decomposition Ratio by Adding Weight to Sales Record

FIG. 46 is a graph showing weights by which the sales record are to be multiplied. The weights shown in FIG. 46 have been written in advance in the RAM 106 or the like. The weight of FIG. 46 is applied to the sales record of FIG. 45, and it is the macro decomposition ratio (mdr).
C2000 cartridge: $100 \times 0.4 + 70 \times 0.3 + 50 \times 0.2 + 20 \times 0.1 = 73$
C4000 cartridge: $30 \times 0.4 + 20 \times 0.3 + 10 \times 0.2 + 50 \times 0.1 = 25$ Therefore, the macro decomposition ratio (mdr) is 73:25. In this way, at the time of creating a macro decomposition ratio, by using weights, a forecast in which the latest data is reflected is possible. Note that it goes without saying that the above-described calculation is realized by the CPU 101.

S4008 is a process which is carried out when the supply sales record term does not satisfy the predetermined term. In this case, the supply macro master DB(N) is referred to, and a supply similar to the supply which is the forecast object is searched for, and the macro decomposition ratio (mdr) corresponding to the similar supply is used.

In S4010, the supply demand forecast result (z) is divided in accordance with the macro decomposition ratio.

In S4011, the macro demand forecast result (FC6) is written into the macro demand forecast result DB (DB(Q)).

In S4012, the macro demand forecast result (FC6) is written into the supply demand forecast result (compensated) DB (DB(B)) as the supply demand forecast result (compensated) (FC2).

Figure 44:
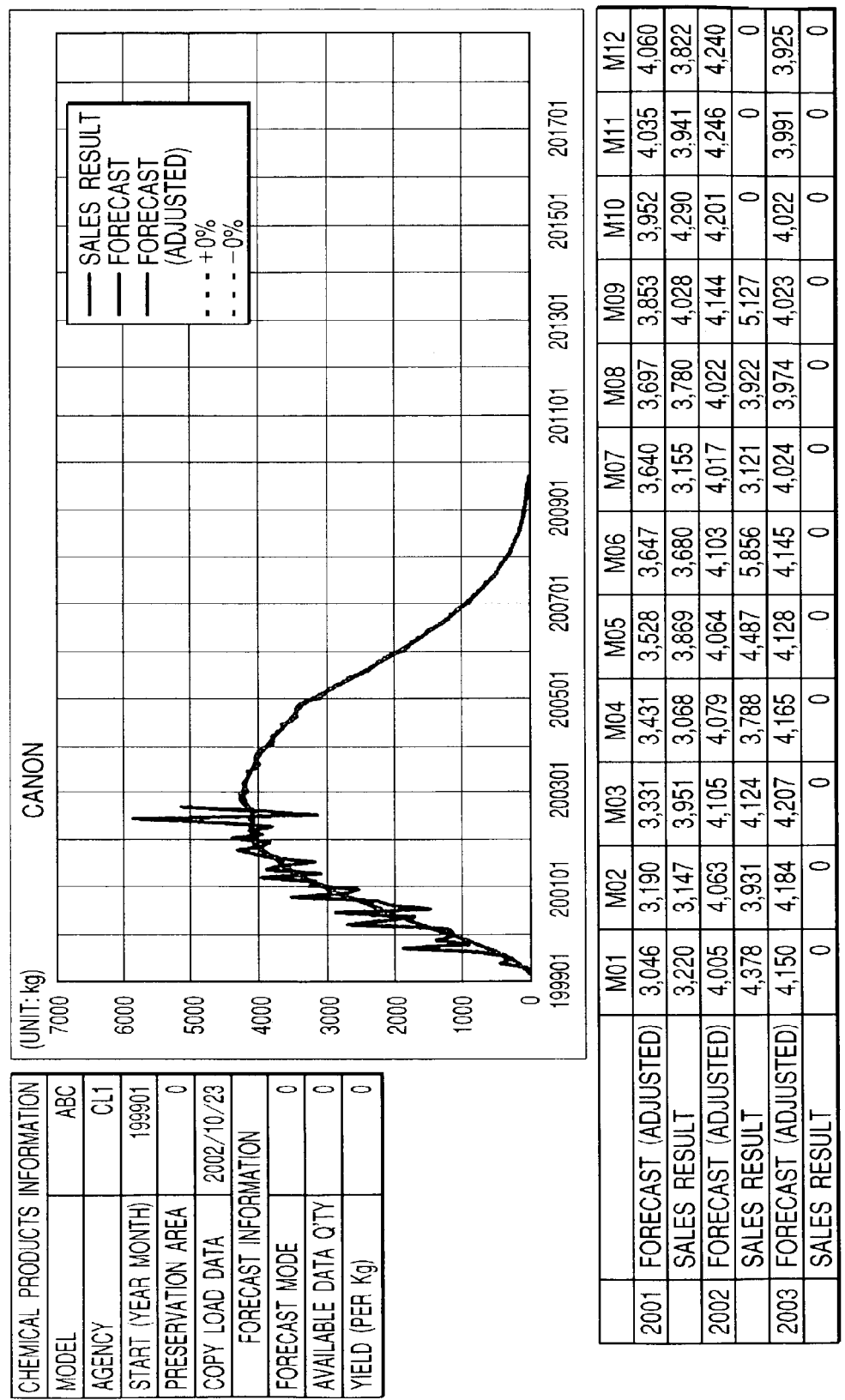
FIG. 44 is a diagram showing a screen at the time of displaying the supply demand forecast result on an output unit 103.

The supply demand forecast result (compensated) is displayed on the output unit 103 by control of the CPU 101. Concretely, respective demand forecasts such as FIG. 37D and FIG. 37E are displayed in the display formats of FIG. 44 (graph format and/or table format).

FIGS. 41A to 41D are transition diagrams of the DB of the supply macro composition module 3803.

FIGS. 42A to 42C are transition diagrams of the DB of the supply macro decomposition module 3805. Note that, in the example of FIGS. 42A to 42C, the macro decomposition ratio is 80:20.

(3) Create Decomposition Ratio by Exchange Rate Effect

Generally, in trade between countries having different currencies, when the same merchandise has been soled in the both countries, there is a trend in which the products are sold more from a country whose currency is weaker to a country whose currency is stronger. The reason for this will be described in the following example.

It is supposed that a certain product AA is sold at $100 in US$ area, and at Euro 100 in Euro area at the time of when the exchange rate is EURO/US$=1.0. Thereafter, it is supposed that the exchange rate becomes EURO/US$=1.1. At this time, if a seller in the Euro area sells the product AA at $100 to the US$ area, the seller can receive 110 EUROs without considering the exporting costs. Even if the exporting costs such as shipping costs, customs duties, or the like are considered, when the exchange rate largely fluctuates, a case in which larger profits can be obtained for the seller can be considered, and it can be thought that the sales figures from a seller in the Euro area to sellers or consumers in the US$ area will increase. When the exchange rate inversely fluctuates, it is supposed that cases in which a product is sold from the US$ area to the Euro area will increase. It can be thought that such cases arise when the exchange rate largely fluctuates or the like in the case of the supply as well. Therefore, when a product is sold from a country to another country having a different exchange rate, because the exchange rate effect on the respective countries cannot be considered in the decomposition ratio calculated from the ratio of only the past sales records, there are a cases in which a precise forecast cannot be calculated, and a demand forecast using a decomposition ratio which considers the exchange rate effect is required.

Hereinafter, one example of computational formulas of the decomposition ratio considering the exchange rate effect will be shown.

In a case in which

Decomposition ratio exchange rate correction coefficient (ERC) YY (set (stored) in advance)

Standard exchange rate (SER) currency AA/currency BB=ZZ (set (stored) in advance)

Pre-correction decomposition ratio of the supply is currency AA area:currency BB area=mdr1:mdr2, when the exchange rate fluctuates to currency AA/currency BB=ZZ1 (the latest actual rate of the exchange or future forecast value acquired from a financial institution such as a bank or the like is used as ZZ1), as one example of the corrected decomposition ratio calculation, when the exchange which is currency $XX$ area:currency $XY$ area=$mdr1+(ZZ1-ZZ) \times YY$:$mdr2-(ZZ1-ZZ) \times YY$ (Formula 35)

is EURO/US$=1.0, the pre-correction decomposition ratio of the supply is EURO AA area:US$ area=1:2, and the decomposition ratio exchange rate correction coefficient (ERC) is 2.

Example 1 When the exchange fluctuates to EURO/US$=0.9, the decomposition ratio is EURO:US$=1+(0.9-1)×2:2-(0.9-1)×2=0.8:2.2=4:11

Example 2 When the exchange fluctuates to EURO/US$=1.1, the decomposition ratio is EURO:US$=1+(1.1-1)×2:2-(1.1-1)×2=1.2:1.8 =2:3

FIGS. 43A to 43E are diagrams showing a list of the databases relating to the supply macro demand forecast.

As is clear from FIGS. 37A to 37E through FIGS. 43A to 43E, in accordance with the present invention, more highly accurate forecasting can be executed on the whole by forecasting by adding mutual effects with respect to markets and sales of products affecting one another. Further, it is possible to implement production, sales, and stock schedules on the basis of the highly accurate forecast. As a result, it is possible to not miss sales opportunities and to maintain appropriate stocks.

As many apparently widely different embodiments of the present invention can be made without departing from the spirit and scope thereof, it is to be understood that the invention is not limited to the specific embodiments thereof except as defined in the claims.

What is claimed is:

1. A sales figures of supply forecasting method for a computer having an input unit, a calculating unit and a display unit, the forecasting method comprising:

a first input in which the input unit inputs sales record figures a(t) of an output main machine, sales schedule figures b(t) of the output main machine and operating main machine record figures y(t);

a first calculation in which the calculating unit calculates operating main machine forecast figures ŷ(t) of the output main machine at time t based on a first formula:

$$\hat{y}(t) = \int_0^t S(t-\tau)x(\tau)d\tau$$

where,
if a(t)=null then x(t)=b(t),
if a(t)≠null then x(t)=a(t),
S(t) is a remaining rate function which expresses a sum of square error between the operating main machine record figures and the operating main machine forecast figures which is calculated from a sales start of the output main machine to a time where the operating main machine record figures is observed;

a second input in which the input unit inputs average record output figures p(t) of prints which are outputted from one output main machine for each unit-time and dummy average output figures q(t) of prints which are previously set;

a second calculation in which the calculating unit calculates average forecast output figures ŷ(t) of prints which are outputted from one output main machine for each unit-time at time t based on a second formula:

$$\hat{v}(t) = ae^{bt^r}$$

where,
  if p(t)=null then v(t)=q(t),
  if p(t)≠null then v(t)=p(t),
  a, b and r are coefficients determined so as to minimize a sum of square error between an average forecast output figures of prints for each unit-time and said v(t);
  a third calculation in which the calculating unit calculates total forecast output figures $\hat{V}(t)$ of prints at time t on a basis of a result of the first calculation and a result of the second calculation based on a third formula:

$$\hat{V}(t) = \hat{v}(t)\hat{y}(t);$$

a third input in which the input unit inputs sales record figures of supply z(t) for a paper, for a toner or for a drum and a diffusion range H;
  a fourth calculation in which the calculating unit calculates a function of forecast sales figures of supply, the calculating unit calculates an endurance print volume C of a supply model and a diffusion density function P(t) on a basis of the input sales record figures of supply z(t) and the input diffusion range H, so that a sum of square error between a fourth formula:

$$\hat{V}(t) = C\int_{t-H}^{t} P(t-\tau)z(\tau)d\tau$$

and the calculated total forecast output figures is minimum, where,
  the diffusion density function P(t)≧0 and $$\int_{0}^{H} P(t)dt = 1,$$

the calculating unit calculates a function $\hat{z}(t)$ as the function of forecast sales figures of supply on a basis of the calculated endurance print volume C, the calculated diffusion density function P(t) and the input diffusion range H, so that a sum of square error between the fourth formula and the calculated total forecast output figures is minimum; and
  displaying in which the display unit displays a forecast result on a display device on a basis of the calculated function of forecast sales figures of supply;
  wherein said t is a time when the sales start is 0.

2. A sales figures of supply forecasting method according to claim 1, wherein, in the first calculation, the calculating unit shifts said x(t) in a direction where said t increases on a basis of a time lag until the output main machine operates.

* * * * *